US007519562B1

(12) United States Patent
Vander Mey et al.

(10) Patent No.: US 7,519,562 B1
(45) Date of Patent: Apr. 14, 2009

(54) AUTOMATIC IDENTIFICATION OF UNRELIABLE USER RATINGS

(75) Inventors: Christopher D. Vander Mey, Seattle, WA (US); Arijit Ghosh, Mercer Island, WA (US); Nikolas C. Gloy, Bellevue, WA (US)

(73) Assignee: Amazon Technologies, Inc., Incline Village, NV (US)

( * ) Notice: Subject to any disclaimer, the term of this patent is extended or adjusted under 35 U.S.C. 154(b) by 713 days.

(21) Appl. No.: 11/096,699

(22) Filed: Mar. 31, 2005

(51) Int. Cl.
*G06Q 90/00* (2006.01)
*G06Q 30/00* (2006.01)
(52) U.S. Cl. .............................. 705/500; 705/12; 705/26
(58) Field of Classification Search ................... 705/12, 705/26, 27, 500
See application file for complete search history.

(56) References Cited

U.S. PATENT DOCUMENTS

| | | | | |
|---|---|---|---|---|
| 6,041,311 | A * | 3/2000 | Chislenko et al. ............. | 705/27 |
| 6,064,980 | A * | 5/2000 | Jacobi et al. .................. | 705/26 |
| 6,260,019 | B1 * | 7/2001 | Courts .......................... | 705/1 |
| 6,505,202 | B1 * | 1/2003 | Mosquera et al. ............. | 707/10 |
| 6,874,143 | B1 * | 3/2005 | Murray et al. ................ | 717/173 |
| 6,895,385 | B1 * | 5/2005 | Zacharia et al. .............. | 705/10 |
| 2002/0107861 | A1 * | 8/2002 | Clendinning et al. ........ | 707/101 |
| 2002/0194119 | A1 * | 12/2002 | Wright et al. ................. | 705/38 |
| 2002/0198866 | A1 * | 12/2002 | Kraft et al. .................... | 707/3 |
| 2003/0078804 | A1 * | 4/2003 | Morrel-Samuels ............. | 705/1 |
| 2005/0034071 | A1 * | 2/2005 | Musgrove et al. ........... | 715/530 |
| 2005/0060665 | A1 * | 3/2005 | Rekimoto .................... | 715/810 |
| 2006/0042483 | A1 * | 3/2006 | Work et al. ................... | 101/91 |
| 2006/0143068 | A1 * | 6/2006 | Calabria ...................... | 705/10 |
| 2007/0050192 | A1 * | 3/2007 | Gutta et al. ................... | 705/1 |

OTHER PUBLICATIONS

Microsoft Press Computer Dictionary, Third Edition, Microsoft Press, Redmond, 1997, p. 341.*
Kaufman, L., "Amazon.com Plans a Transformation to Internet Bazaar," New York Times, Late Edition—Final Ed., col. 1, p. 1, Sep. 30, 1999.*
U.S. Appl. No. 11/038,453, filed Jan. 18, 2005, Siegel.
Kou, Y., et al., "Survey of Fraud Detection Techniques," Proceedings of the 2004 International Conference on Networking, Sensing, and Control pp. 749-754, Taipei, Taiwan, Mar. 21-23, 2004, retrieved from http://europa.nvc.cs.vt.edu/~yfkou/research.htm, 6 pages.

* cited by examiner

*Primary Examiner*—Nicholas D Rosen
(74) *Attorney, Agent, or Firm*—Seed IP Law Group PLLC

(57) ABSTRACT

Techniques are described for enhancing the reliability of information received from users in various ways, such as by analyzing votes or other ratings supplied by a user in order to identify fraudulent and other unreliable ratings. Such analysis may be based at least in part on prior ratings submitted by the user, such as based on one or more patterns indicating that the user has a bias for or against one or more of various aspects. Unreliable ratings can then be excluded from use in various ways. This abstract is provided to comply with the rules requiring it, and is submitted with the intention that it not limit the scope of the claims.

102 Claims, 21 Drawing Sheets

| | A1 | A2 | A3 | A4 | A items average | B1 | B2 | B3 | B items average | C1 | C2 | C3 | C4 | C items average | Average |
|---|---|---|---|---|---|---|---|---|---|---|---|---|---|---|---|
| U1 | 5 | 5 | 5 | 5 | 5 | 1 | 1 | 1 | 1 | 3 | 4 | 5 | 3 | 3.75 | 3.45 |
| U2 | 1 | 1 | 1 | 1 | 1 | 1 | 1 | 1 | 1 | 1 | 1 | 1 | 1 | 1 | 1 |
| U3 | 3 | 4 | 3 | 1 | 2.75 | 5 | 5 | 4 | 4.67 | 3 | 3 | 4 | 2 | 3 | 3.36 |
| U4 | 3 | 2 | 3 | 1 | 2.25 | 4 | 3 | 4 | 3.67 | 2 | 4 | 4 | 3 | 3.25 | 3 |
| U5 | 1 | 1 | 1 | 1 | 1 | 5 | 3 | 3 | 3.67 | 4 | 3 | 3 | 4 |  | 2.14 |
| U6 | 3 | 5 | 3 | 1 | 3 | 4 | 3 | 4 | 3.67 | 2 | 2 | 2 | 2 | 3.5 | 3.4 |
| U7 | 5 | | 3 | | 3 | 5 | | | 5 | | | | | 2 | 2.75 |
| U8 | 4 | 4 | 4 | 4 | 3.75 | | | 4 | 4 | 2 | 3 | 4 | 3 |  | 3.8 |
| U9 | 4 | 3 | | 5 | 4 | 3 | 3 | 4 | 3.33 | 3 | | | | 3 | 3.45 |
| U10 | 4 | 3 | 4 | 5 | 4 | | 3 | 4 | 3.5 | 3 | 3 | 3 |  | 3 | 3.63 |
| Item Average | 3.3 | 3.11 | 3 | 2.5 | | 3.5 | 2.75 | 3.22 | | 2.5 | 2.86 | 3.25 | 2.57 | | |

FIG. 6

AUTOMATIC IDENTIFICATION OF UNRELIABLE USER RATINGS

TECHNICAL FIELD

The following disclosure relates generally to techniques for enhancing the reliability of information, and more particularly to automatically identifying user votes and other ratings that are unreliable, such as by determining if a vote from a user is biased or fraudulent based on patterns from prior votes from that user.

BACKGROUND

As the Internet and other online access to information continues to grow, users are increasingly presented with an over-abundance of available information content without effective means to manage it (e.g., to identify content that is relevant, accurate and enjoyable). One particular example of an increasing source of content relates to merchants who provide items (e.g., products, services, and/or information) via the World Wide Web ("the Web") that customers can acquire, such as items available for purchase, rent, lease, license, trade, evaluation, sampling, subscription to, etc. It is common for such Web merchants and other online retailers to design their Web sites to display content in order to draw interest to items available from the Web site. As one example of such content, some Web merchants include item reviews on their Web sites, such as to provide additional information about an item.

While Web merchants may in some cases pay professional reviewers to prepare item reviews, procuring such reviews can be expensive, and some readers of professional reviews may be distrustful of the evaluation from a professional reviewer. Thus, volunteer users of a Web site, such as customers of a merchant's Web site, are often solicited to prepare item reviews, as well as to rate available items. Similarly, in many situations a Web merchant or other Web site operator may solicit or accept other types of content from volunteer users, such as images of items for sale (e.g., images of the items in use) or other types of images, or information of other types in other forms (e.g., audio information, video information, photos, textual information, etc.). However, while volunteer item reviews, item ratings and other user-supplied information may have advantages over professional reviews, ratings and other professionally-supplied information in terms of cost and of appeal to some readers, volunteer programs often have significant disadvantages of their own. For example, it can often be difficult to convince volunteers to prepare item reviews or to provide ratings or other information. In addition, many such volunteer reviews may be of little use to other users (e.g., prospective purchasers) for a variety of reasons, such as poor writing and/or analysis, the inclusion of irrelevant and/or inappropriate subject matter, opinions that differ greatly from those of most other users, etc.

Another significant problem with item reviews authored by volunteer reviewers, as well as with item ratings and a variety of other types of information provided by users, is that the information may be inaccurate, such as due to biases of the users who provide the information. For example, with respect to item reviews authored by volunteer reviewers, a reviewer affiliated with an item (e.g., an author of a book) may provide an overly laudatory review of the item, while other reviewers (e.g., authors of competing books) may provide overly critical reviews of the item. This problem can be mitigated when the actual identity of the user who provided the information is indicated to others, both by allowing others to hold a user who provides information accountable for that information, and by allowing others to discount information based on the identity of the user who provided the information if they so desire. However, many existing systems allow users to provide information anonymously or using a pseudonym, which does not allow other users to assess the credibility of such information. Moreover, even if such systems do display a name of the user who provided information, the systems do not typically provide any assurance that the displayed user's name is authentic, leaving such systems susceptible to users who attempt to surreptitiously influence others by disguising their actual identities.

In view of the above-discussed problems, it would be beneficial to enhance reliability and credibility of information by identifying potentially fraudulent, biased, unhelpful or unuseful information.

BRIEF DESCRIPTION OF THE DRAWINGS

FIG. 6 is a database illustrating examples of types of fraudulent or unreliable ratings.

DETAILED DESCRIPTION

Figure 1:
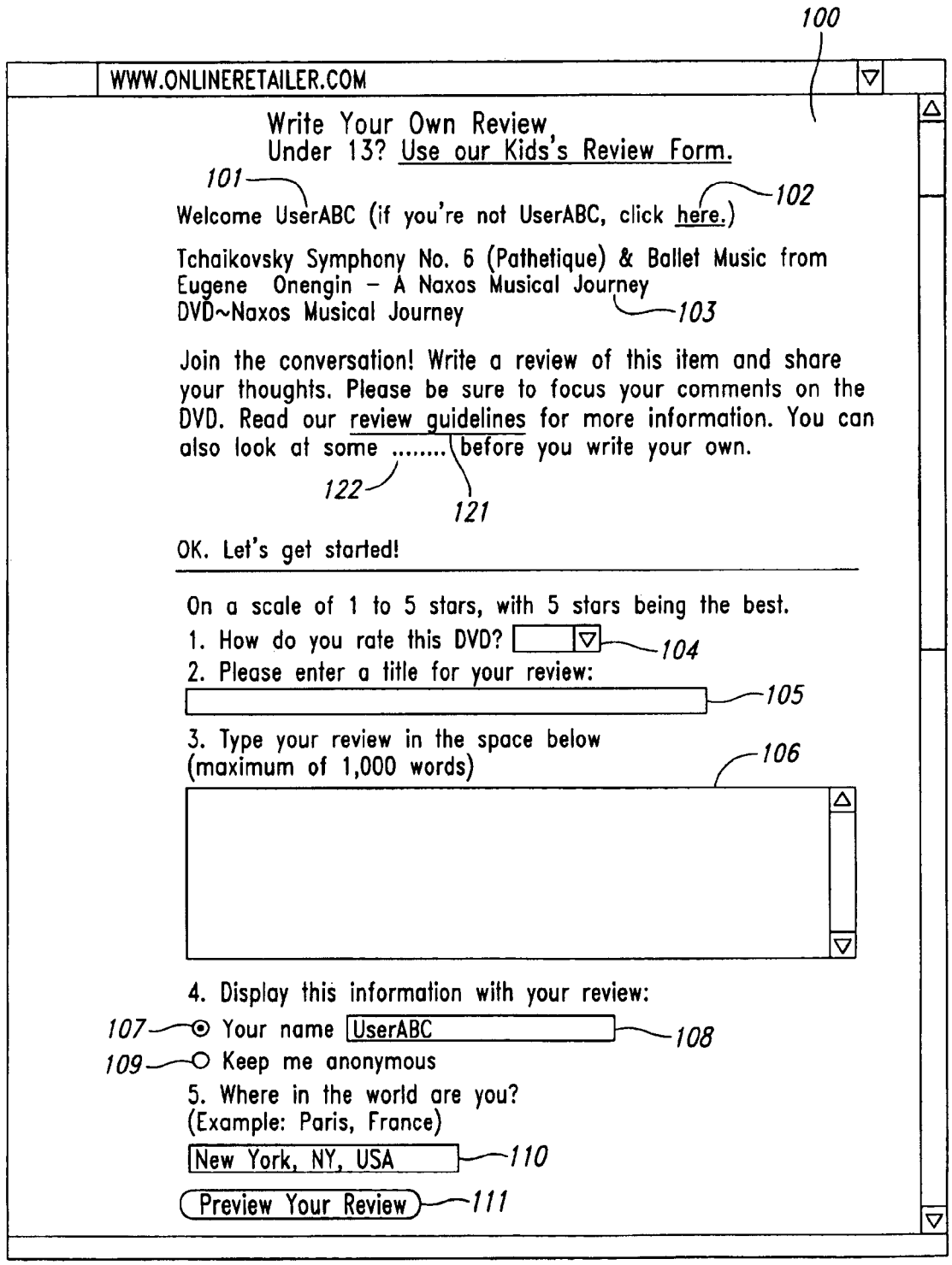
FIG. 1 is a display diagram illustrating an example of a display that enables a user to submit a new review.

Techniques are described for enhancing the reliability of information received from users in various ways. In some embodiments, information supplied by users is automatically analyzed to determine whether the information is sufficiently reliable, and if so the information may be used in various ways. As one example, in some such embodiments the user-supplied information includes votes or other ratings by users related to items offered by an online retailer, such as ratings of usefulness or other aspects of item reviews supplied by other users. Such user-supplied ratings may be automatically analyzed so that only ratings that are determined to be sufficiently reliable are used as part of a system for rating content and/or users, such as by excluding ratings that appear likely to be biased or intentionally fraudulent (e.g., in an attempt to artificially manipulate the rating system for particular content and/or users).

The determination of whether information is sufficiently reliable may be performed in various ways in various embodiments. As discussed in greater detail below, in some embodiments various pattern-based analyses are performed on multiple pieces of information supplied by a single user in order to identify patterns that correspond to an increased likelihood of unreliability. For example, such pattern-based analyses may identify patterns involving users of online retailers who have suspicious patterns of activity involving providing ratings related to items available from the online retailer, such as "new" users who open a new account and immediately become prolific raters who provide large numbers of ratings, users who engage in "block voting" in which significant numbers of ratings are repeatedly performed in relatively small blocks of time interspersed with other periods of time having few or no ratings performed, and users whose ratings consistently show a significant positive or negative bias. In addition, some patterns of ratings may further signify the potential participation of an automated software program who is providing ratings on behalf of a user, such as based on a sufficiently large quantity of ratings in a small amount of time.

In addition, in some embodiments pattern-based analyses may further identify an unreliable rating from a user based at least in part on information from other users. For example, a rating from a user related to an item (e.g., a rating of an item review for the item) may be compared to similar ratings from other users (e.g., ratings for the same item review), such as to detect ratings that are significantly outside the normal range or distribution of ratings. Moreover, when analyzing multiple prior ratings from a user in light of similar ratings from other users for some or all of the prior ratings, additional patterns may be identified, such as a consistent targeted bias of a user for only a subset of the user's ratings that have one or more common factors (e.g., a bias for or against a particular type or category of item, a bias for or against items from a particular manufacturer or otherwise associated with a particular source, a bias for or against item reviews supplied by a particular user, etc.), or a consistent disagreement from the consensus of the ratings from other users.

In some embodiments, various other information about a user may also be used to assist in identifying unreliable ratings from the user, such as information about other activities performed by a user (e.g., to identify "shell" accounts of users who create one or more accounts only to supply fraudulent ratings and who do not engage in other typical types of activities, such as shopping-related activities for users of online retailers). In addition, in some embodiments other techniques are used to identify when a single user inappropriately creates and uses multiple accounts to impersonate multiple different users, such as by identifying information in their electronic communications to determine that all of the communications come from a single computing device or are otherwise associated with a single user. Similarly, in at least some embodiments the rating histories of multiple users are compared in order to identify groups of users that appear to be inappropriately collaborating, such as due to an abnormally high degree of consistency between the ratings of the users in a group.

As previously noted, in some embodiments the ratings from users reflect evaluations by the users of available content (e.g., votes on or other forms of rating or reviewing of one or more attributes of the content), and such ratings may be used in various ways when they are reliable, including to assist in the identification of content with various attributes of interest. As illustrative examples, content being evaluated and managed may include item reviews and/or how-to guides provided to a Web merchant or other online retailer by user authors, photos and other images from users that have various subject matter (e.g., related to items available from an online retailer and/or to users who supply the information), audio and/or video information from users with various subject matter, blogs and blog blurbs (or other portions of blogs) by users (which may be evaluated so as to select the "best" blurb from a particular blog), other forms of textual information from users (e.g., product manuals for items available from an online retailer), etc. More generally, the content to be evaluated and managed may in some embodiments be any information that has one or more attributes that can be evaluated by other users (e.g., information that includes one or more factual assertions or opinions, with the evaluations used to certify the accuracy and/or truthfulness of those assertions), and may be information supplied by users and/or from other sources (e.g., from Web site operators).

For illustrative purposes, some embodiments are described below in which item reviews at a Web merchant are the content provided by reviewer users and in which evaluations of the item reviews are the ratings provided by other users of the Web merchant system. In addition, a variety of details are discussed below regarding specific techniques for calculating reliability and/or usefulness of item reviews and evaluations of item reviews for reviewers and evaluators and for using them in specific ways to provide benefits to authors, evaluators, and readers of content. However, those skilled in the art will appreciate that the invention is not limited to use with Web merchant systems or which the specific calculation techniques, and that the techniques of the invention can be used in a wide variety of other situations, such as to determine and track reliability of other types of individuals and/or companies (e.g., suppliers, manufacturers, partners, vendors, affiliates, employees, customers, etc.) that provide information or otherwise perform interactions or activities that can be evaluated.

In addition, additional details related to soliciting and processing item reviews and evaluation votes are included in co-pending U.S. patent application Ser. No. 10/646,341, filed Aug. 22, 2003 and entitled "Managing Content Based on Reputation," which is hereby incorporated by reference in its entirety; and in co-pending U.S. patent application Ser. No. 11/024,006, filed Dec. 27, 2004 and entitled "Using Corroborated User Identities to Enhance Information Credibility," which is hereby incorporated by reference in its entirety.

Figure 2:
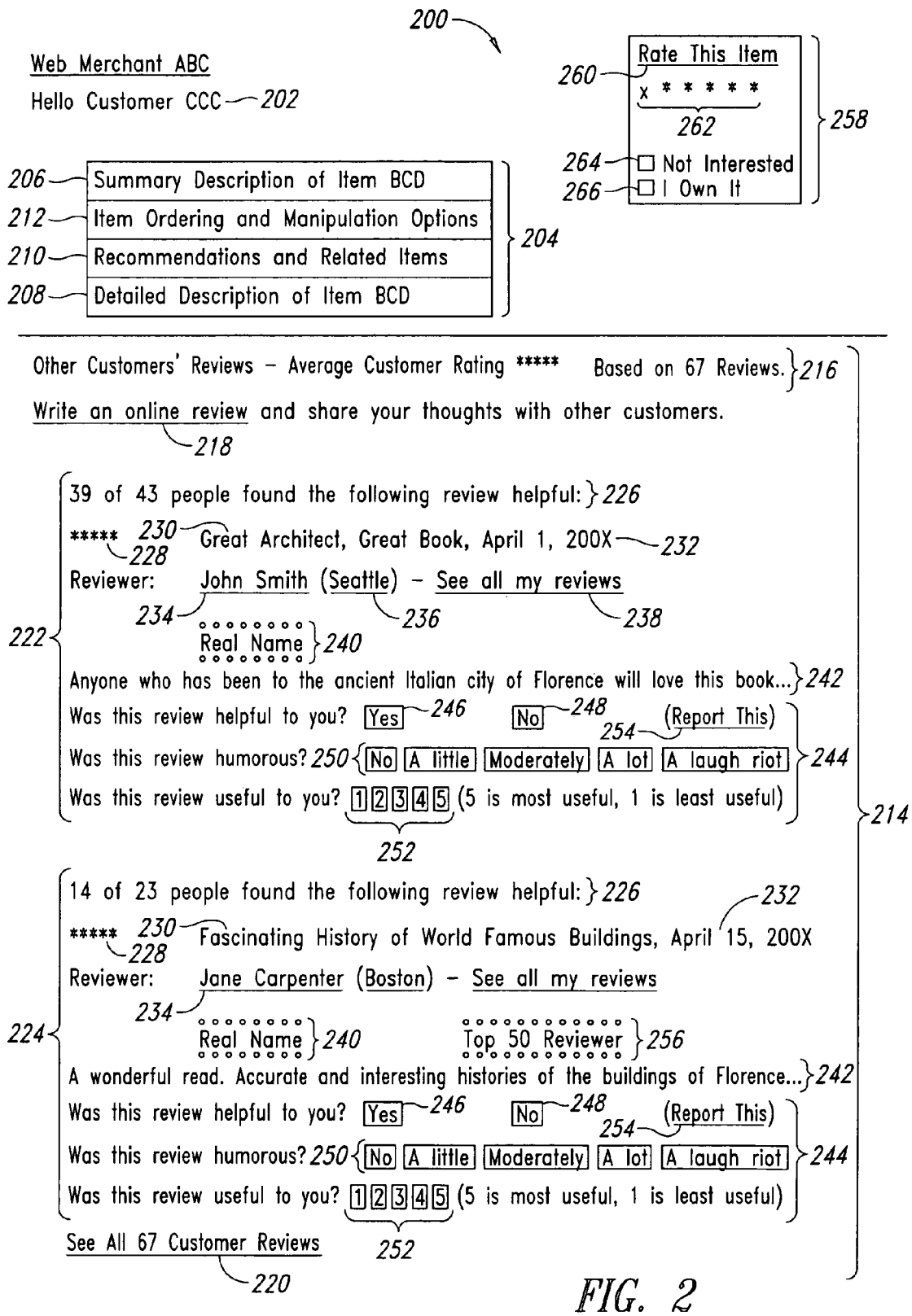
FIG. 2 is a display diagram illustrating an example of a display that provides detailed information about an available item along with item review content regarding that item and that allows a user to submit ratings of the review.

FIGS. 1 and 2 illustrate examples of obtaining item reviews from a user and of reviews or other ratings by a user of item reviews provided by other users. An item review or rating may, for example, comprise a numerical rating, a Boolean rating, textual comments, or combinations thereof.

In particular, FIG. 1 is a display diagram illustrating an example of a display that enables an author, such as a user, to submit a new item review, with analogous information to allow evaluators to submit evaluations similarly able to be provided (although not shown here for the sake of brevity). The user typically receives this display in conjunction with a particular item for which the user can submit an item review, although in other situations users could submit information not specific to an item (e.g., a blurb for a personal blog of the user). In this example, display 100 is provided in response to the user's selection of a link (see, for example, links 218 and 260 in the display 200 shown in FIG. 2, below). The display 100 includes information 101 identifying the user, which is attributed as the identity of the reviewer. To attribute a different identity to the reviewer, the user can select link 102. The display 100 also includes summary information 103 describing the item to be reviewed.

In this example, the display 100 also includes a control 104 used by the user to specify a grade or numerical rating for the reviewed item, a field 105 for entering a title for the review, and a field 106 for entering textual comments for the review. The user may select button 107 in order to display a user or reviewer name with the review, which may be edited in field 108. Alternatively, the user may select button 109 to make the review anonymous (which in some embodiments may affect any use of the review, such as to treat it as unreliable, while in other embodiments it will not affect such use of the review and the review will be assessed as to reliability in the same manner as other reviews). The display also includes field 110 for entering the author's location. Before preparing the review as described, the user may also select link 121 in order to display guidelines for preparing the review and/or may select link 122 in order to display one or more example customer reviews demonstrating compliance with the review guidelines. When the user has assembled the review to be submitted, the user selects button 111.

FIG. 2 illustrates an example of Web Merchant ABC using a item review previously provided by an example customer John Smith by presenting the item review to another example customer CCC. In particular, FIG. 2 illustrates an information screen 200 with various information about an example Item BCD that is presented to Customer CCC, as indicated in section 202. Section 204 of the information screen includes various information about Item BCD and related functionality, including summary descriptions 206 and detailed descriptions 208 of the item, information about recommendations and related items 210, and information and user-selectable controls 212 related to item ordering and other related operations (e.g., controls for adding the item to a shopping cart, adding the item to a wish list or registry, making information about the item available to others, etc.).

In addition to the information 204 related to Item BCD, information screen 200 further includes various information 214 regarding item reviews for the item from other customers of Web Merchant ABC. The review information includes overview or summary information 216 related to others' reviews, and a user-selectable control 218 with which Customer CCC can select to provide their own item review for the item. In this example, two of sixty-seven available item reviews of other customers have been selected for presentation to Customer CCC, with various factors able to be used as part of the selection process (e.g., assessed quality or usefulness of the item reviews based on ratings from other users). Information screen 200 also includes in this example a user-selectable control 220 via which Customer CCC can select to see all reviews available for this item. In this example embodiment, the displayed item reviews include item review 222 provided by customer "John Smith", as well as item review 224 provided by another customer "Jane Carpenter."

In this embodiment, item review 222 includes information 226 regarding how many people found item review 222 helpful. Item review 222 contains a representation 228 of a numerical review provided by reviewer Smith, which as illustrated comprises four stars out of five possible stars. Item review 222 also contains a title of the item review 230, a date of the item review 232, a link 234 to more information associated with the reviewer (for example, a link to a blog or Web page of the reviewer), a link 236 to a city associated with the reviewer (for example, a link to products associated with the city), and a link 238 to other item reviews by the reviewer. Item review 222 also contains information 240 indicating that an identity of the reviewer has previously been confirmed or otherwise corroborated, and a textual review 242 provided by the reviewer.

Item review 222 also contains a section 244 where customer CCC can provide feedback, such as one or more ratings, for the item review 222. In particular, in this example Customer CCC can indicate item review 222 was helpful by selecting button 246, or that item review 222 was not helpful by selecting button 248, or alternatively can indicate the extent or degree to which customer CCC considered the item review 222 useful by selecting one of the buttons 252 representing a range of options. Customer CCC can also indicate the extent to which customer CCC considered item review 222 humorous in this example by selecting one of the buttons 250. In other embodiments, only a single alternative may be available for rating an item review, and that alternative may have various forms. Section 244 also contains a link 254 to a display (not shown) where customer CCC can report that item review 222 contains scandalous or inappropriate material. Item review 224 contains similar information, sections and links to those described above with respect to item review 222, with similar reference numbers. Item review 224 also contains display badge information 256 indicating that reviewer Jane Carpenter is a Top 50 Reviewer, such as based at least in part on the rated quality of her item reviews.

In this example, display 200 also contains a section 258 which customer CCC can use to rate or review the item BCD. For example, customer CCC can select link 260 to be presented with a display (see, for example, display 100 illustrated in FIG. 1) where customer CCC can provide a review of the item BCD. Customer CCC can also select one of the stars in field 262 to provide a numerical or enumerated rating of item BCD. In addition, customer CCC can select button 264 to indicate a lack of interest in item BCD, and button 266 to indicate ownership of item BCD.

Figure 3:
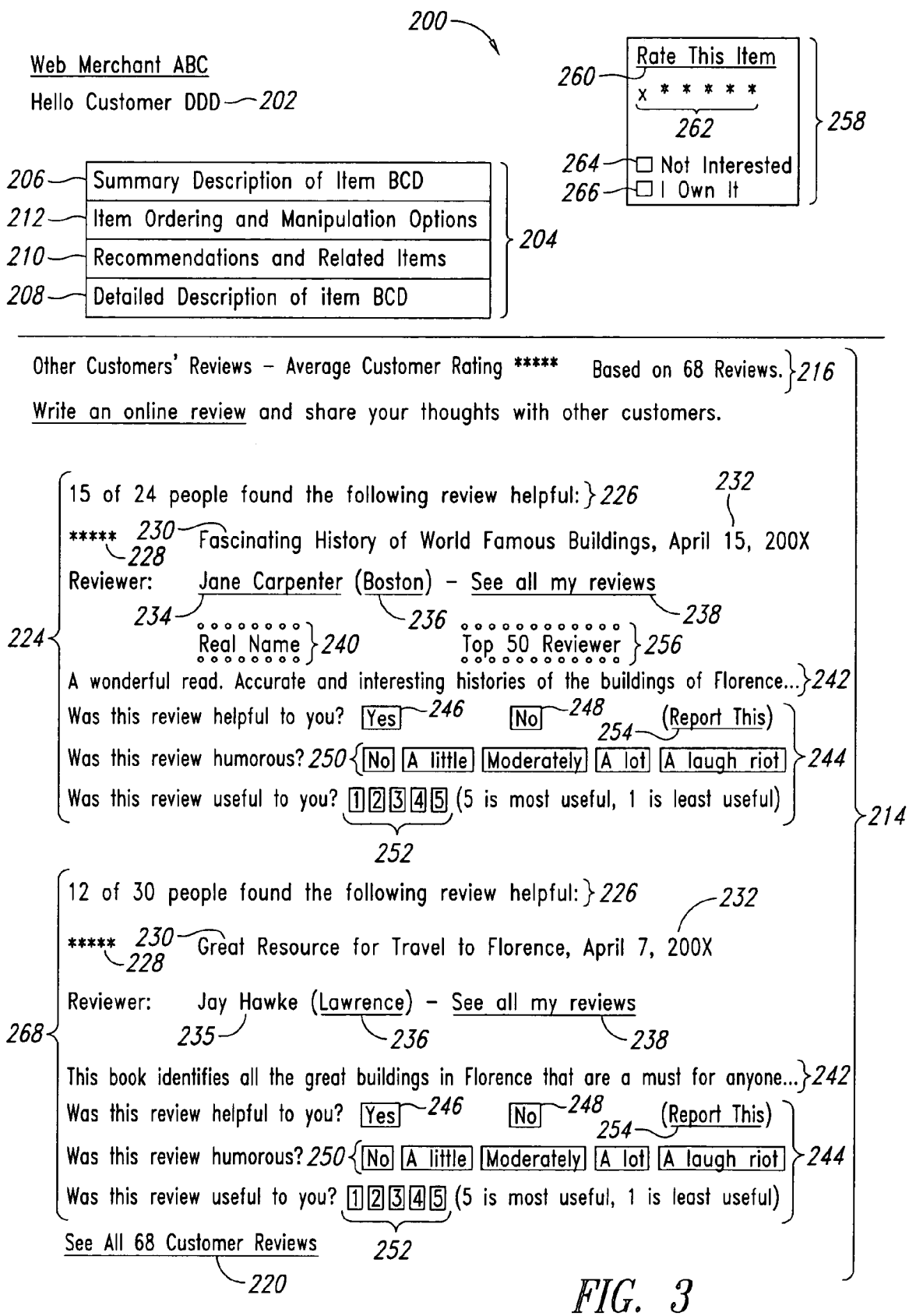
FIG. 3 is a display diagram illustrating an example of a display that provides detailed information about an available item along with item review content regarding that item and that allows a user to submit ratings of the review.

FIG. 3 illustrates the impact that a review by a customer of an item or of an item review (e.g., reviews by customer CCC of item BCD and of item reviews 222 and 224 in FIG. 2) can have on the information presented about an item, such as item BCD, to another customer DDD. The reference numbers in FIG. 3 are similar to those used in FIG. 2 to facilitate understanding of example changes to the information presented to customer DDD.

For example, the average customer rating displayed in the summary information 216 of FIG. 3 indicates an average rating of three stars instead of the previous average of four stars. This change could occur, for example, as a result of customer CCC entering a one-star rating in field 262 of FIG. 2. The summary information 216 in FIG. 3 also indicates that the average is based on 68 reviews, rather than 67 reviews as shown in the summary information 216 of FIG. 2.

In addition, item review 222 no longer appears in screen 200 of FIG. 3; it has been replaced by item review 224. This could occur, for example, if customer CCC selected link 254 in FIG. 2 and reported that item review 222 contained scandalous or inappropriate material, or selected button 248 to indicate item review 222 was not helpful. In some embodiments, such as the illustrated embodiment, item review 222 might not be displayed to subsequent customers such as customer DDD until the accuracy of CCC's report or helpfulness rating could be reviewed.

New item review 268 has also been added to FIG. 3 to replace item review 224. New item review 268 does not contain information 240 or 256, which could happen, for example, if the identity of reviewer Jay Hawke could not be verified and if reviewer Jay Hawke was not a top reviewer. In addition, link 234 does not appear in new item review 268 and instead has been replaced with information 235. This could occur, for example, when there is no link associated with reviewer Jay Hawke.

The summary information 226 of item review 224 in FIG. 3 has been modified to indicate that 15 of 24 people found item review 224 helpful. This could occur, for example, if customer CCC selected button 246 of item review 224 in FIG. 2, thus indicating that customer CCC found item review 224 helpful. In addition, the link 220 has been modified in FIG. 3 to indicate that 68 customer reviews have been received.

Figure 4:
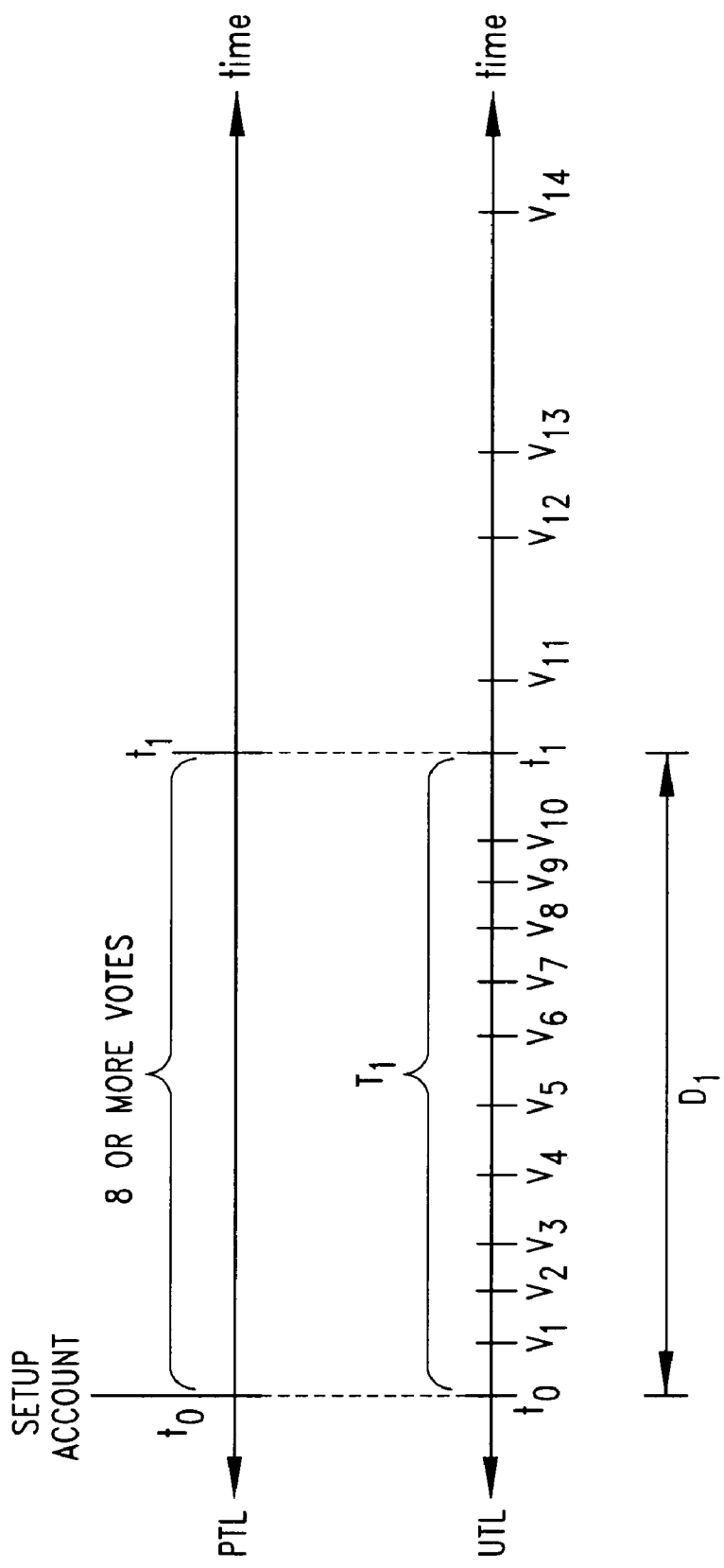
FIG. 4 is a timeline illustrating an example of a type of fraudulent voting.
Figure 5:
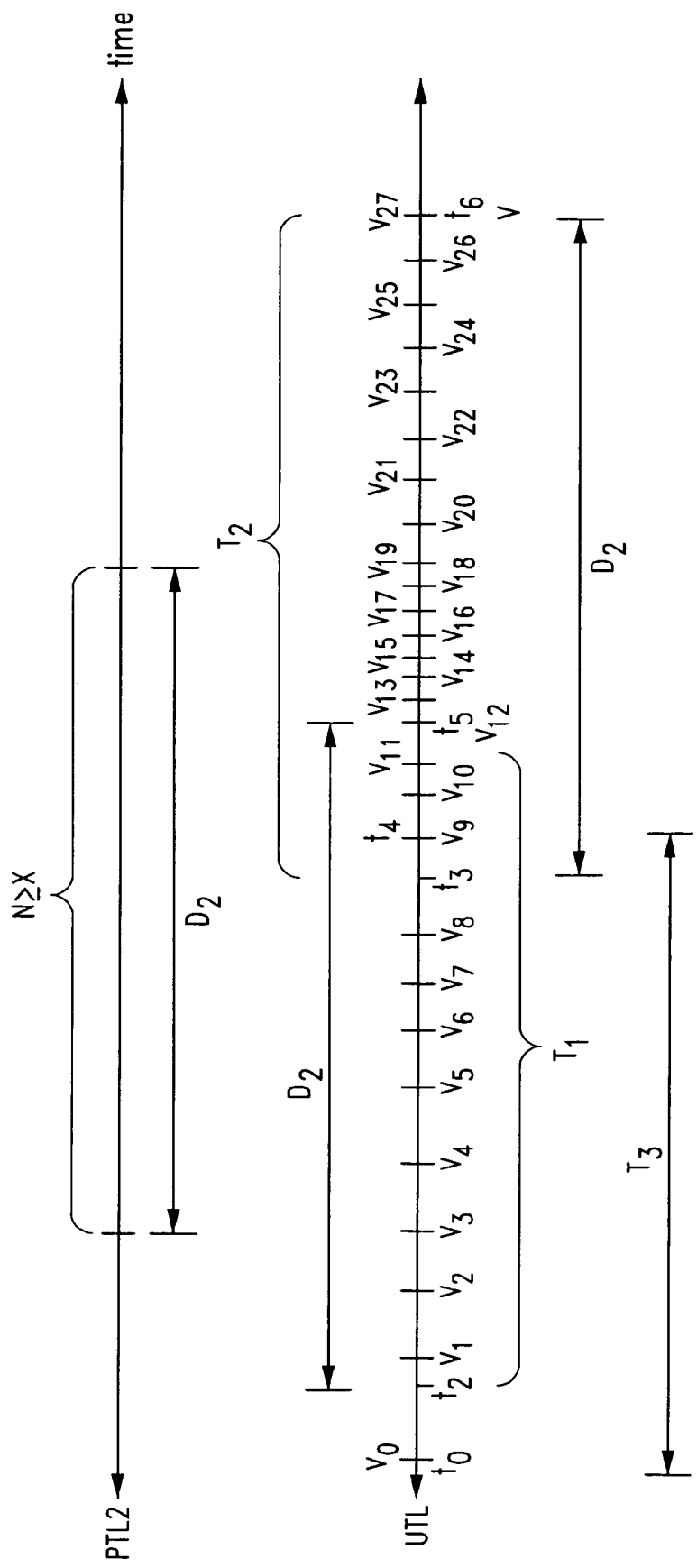
FIG. 5 is a timeline illustrating examples of types of fraudulent voting.

FIGS. 4-6 provide various example information regarding user-supplied information that may be analyzed in order to identify potentially unreliable information. In particular, FIGS. 4 and 5 are example timelines illustrating potential yes/no block-voting patterns. FIG. 4 illustrates comparing an example pattern timeline PTL consistent with a prolific new voter pattern to an example timeline UTL of yes/no votes by a user, such as customer CCC of web merchant ABC. The user creates a new user account at time $t_0$, and then proceeds to cast 14 votes, $V_1$ to $V_{14}$. During time period $T_1$ of duration $D_1$, which runs from time t0 to time t1, the user casts ten votes, $V_1$ to $V_{10}$. The number of votes cast by the user, ten, may exceed a threshold number of votes for a time period of duration $D_1$ starting at a time period $t_0$ when a user creates a new user account. For example, if, as illustrated, the threshold is eight or more votes during the time period of length $D_1$ after creation of a new user account for the prolific new-voter pattern, then the user would be identified as engaging in a prolific new voter type of block-voting because the number of votes cast, ten, exceeds the pattern threshold of eight votes cast within the time period $T_1$. As discussed in more detail below, as each vote is cast by user CCC during time period T1, the vote is checked against the pattern. For votes $V_1$ to $V_7$ and $V_{11}$ to $V_{14}$, a pattern match would not be detected. For votes $V_8$ to $V_{10}$, a pattern match would be detected. As discussed in more detail below, in some embodiments only votes $V_8$ to $V_{10}$ would be identified as potentially fraudulent or otherwise unreliable as a result of the match, while in other embodiments other results may occur, such as to identify votes $V_1$ to $V_{10}$ as fraudulent or unreliable, or to identify all of the votes $V_1$ to $V_{14}$ as fraudulent or unreliable. In some embodiments, a portion of the votes may be identified as fraudulent or unreliable and another portion of the votes may also be flagged for further evaluation of their reliability.

The example threshold value can be selected in various ways, such as based on a statistical analysis to identify behavior that differs sufficiently from the norm (e.g., at least twice a standard deviation) and/or that is correlated with other users that were later identified as acting inappropriately, although in this example the threshold is selected based on example past experience that a new user who casts more than eight votes within five minutes of creating an account is likely to be using a disposable account for the purpose of skewing the information presented about an item (such as the information about item BCD in FIGS. 2 and 3). The new-prolific voter concept can be extended to reviews of types other than yes/no votes, such as other ratings and textual reviews. Other patterns can be employed, such as a pattern with a threshold of 20 votes in a duration of three minutes, which might suggest the new user is engaging in automated voting. Multiple prolific new voter patterns can be employed, and in some embodiments different degrees of assessed unreliability can be assessed to different ratings (e.g., a very small or zero degree to the first 5 votes, a small but growing degree to votes 6-8, and a medium or large degree to some or all votes beyond 8).

FIG. 5 is an example timeline illustrating comparing a pattern timeline PTL2 indicating that a user may be engaging in block voting to an example timeline UTL of votes cast by a user, such as customer DDD of Web merchant ABC. A match to the pattern is detected when the number of votes cast N during a time period of duration $D_2$ equals or exceeds a threshold value X. The timeline for the votes cast by the user illustrates twenty-eight votes by the user, votes $V_0$ to $V_{27}$. For ease of illustration, testing for a pattern match will first be discussed with respect to vote $V_{12}$ and vote $V_{27}$, although any of the votes in the timeline or history could be checked for a pattern match.

Suppose the threshold value X is fifteen. The user casts vote $V_{12}$ at time $t_5$. The time period $T_1$ between time $t_2$ and time $t_5$ is of duration $D_2$. The number of votes cast by the user during time period $T_1$ is twelve. Thus, no match is detected for vote $V_{12}$ because twelve is not equal to or greater than fifteen. The user casts vote $V_{27}$ at time $t_6$. The time period $T_2$ between time $t_6$ and time $t_3$ is of duration $D_2$. The number of votes cast during time period $T_2$ is nineteen. Thus, a match is detected because the number of votes cast during time period $T_2$ is greater than the threshold value X of fifteen votes.

As discussed in more detail below, in some embodiments an indication of block activity alone may not be sufficient to designate a vote or rating as fraudulent or unreliable. In such embodiments, an indication of block activity together with one or more other indications that a vote or rating is unreliable may be required for a vote to be classified as fraudulent or unreliable. Consider the example discussed where vote $V_{27}$ was determined to be part of a block vote. The first vote in the block is vote $V_9$. Vote $V_0$ represents the very first vote (the original vote) cast by the user and occurred at time $t_0$. Vote $V_{27}$ may be identified as a prolific new voter vote if the duration $D_3$ of the time period $T_3$ between the time to when the original vote $V_0$ was cast and the time $t_4$ when the first vote in the block (vote $V_9$) was cast is less than a threshold time period.

FIG. 6 is an illustration of a data structure 600 illustrating examples of fraudulent or unreliable user reviews in the form of user ratings on a scale of 1-5, with 1 being the lowest user rating of an item and 5 being the highest user rating of an item. Columns A1-A4 correspond to target items associated with a source A, columns B1-B3 correspond to target items associated with a source B and columns C1-C4 correspond to target items associated with a source C. A target item may be, for example, a product or a review of a product. A source may be, for example, a supplier of an item or a reviewer who authors an item review. The rows U1-U10 correspond to users. The data at an intersection of a column corresponding to an item and a row corresponding to a user is a rating of the item provided by the user.

In the illustrated example, the data structure 600 is also illustrated with additional aggregate rating information for the sake of clarity, including an average source rating value column 602 for items associated with source A, an average source rating value column 604 for items associated with source B, an average source rating value column 606 for items associated with source C and an overall average rating value column 608. The data at an intersection of an average source column and a user is an average of the ratings provided by the user for items associated with the particular source. The data at an intersection of the overall average column 608 and a user row is an average of the ratings provided by the user for all items rated by the user. The data structure 600 as illustrated also contains an item average rating value row 610 that is similarly illustrated for the sake of clarity, with the data at an intersection of the item average row 610 and an item column being an average user rating for the item. Rather than being stored in the data structure 600, however, the data entered in the average columns 602, 604, 606, 608 and the average row 610 may instead be calculated as needed or stored in a separate data structure in other embodiments.

Using these example user ratings, various patterns of potential unreliability may be identified, such as to detect bias by analyzing the voting history of a user. Row U1 provides several examples of potential user bias. Bias could be detected by, for example, comparing an average user rating for items associated with a particular source to an overall average user rating provided by the user, and when the difference exceeds a threshold value, indicating that the user has a bias against the particular source. For example, if in an embodiment the threshold is set at a difference of 2 or greater between an average rating submitted by a user and an average rating by the user for items associated with a particular source, it would be determined that user U1 has a bias against source B. In other words, the voting history for user U1 matches a pattern indicating a bias against source B. If in another embodiment the threshold were a difference of more than 1.5, user U1 would also match a pattern for having a bias in favor of source A. In some embodiments, the threshold might be set so as to detect only negative bias. For example, if the threshold were an average rating associated with a source that is more than 1.5 less then an average rating for all sources, the ratings by user 1 of items associated with source B would match the pattern for bias. Some embodiments might employ an absolute threshold, rather than a relative threshold. For example, a user might be determined to have a bias against a particular source if an average rating from the user for items associated with the source is below a threshold minimum value. For example, if the threshold minimum value for an average rating for items associated with a source is 2.2, the ratings provided by user U1 for items associated with source B would match a pattern for a bias against source B because the average rating by user U1 for items associated with source B is 1, which is less than the threshold of 2.2.

Row U2 contains an example of ratings from an unreliable user, such as due to the user having a consistent negative bias. For example, if an average user rating is below a threshold value, ratings by the user may match a pattern indicating the user provides unreliable ratings. In some example embodiments, a threshold for an average user rating might be set at 2. In such embodiments, it would be determined that ratings from user U2 match a pattern indicating that the ratings are unreliable because the average rating from user U2 is 1, which is less than the threshold average user rating of 2. Note that the ratings by user U2 might also match some of the patterns for bias discussed above with regard to ratings by user U1.

Unreliability can also be detected by comparing a review by a user of an item to reviews by other users of the same item. For example, if a rating provided by a user is more than a threshold value lower than an average rating for the item, the rating may match a pattern for an unreliable rating. Consider item A4. In an embodiment where a threshold difference from average is set at two or more points below an average rating, none of the ratings for item A4 would match a corresponding pattern for unreliability because all of the ratings are higher than 0.5 (the average rating 2.5 minus the threshold of 2.0). The same threshold when applied to item A3, however, would indicate that the ratings of item A3 provided by users U2 and U5 matched the pattern for an unreliable rating. In some embodiments a different threshold of 1.5 or more below the average might be employed. In such embodiments, the ratings of item A4 by users U2 through U7 would match the pattern for an unreliable rating.

As discussed in more detail below, the confidence that an identification of a particular rating as biased or otherwise unreliable is accurate can be increased by having more than one pattern indicating unreliability be matched, such as a threshold before a particular rating will be identified as unreliable. For example, the rating by user U7 of item A4 would match some, but not all, of the example patterns discussed above. The rating of 1 by U7 user does not match the patterns for bias in the embodiments discussed above with respect to user U1 because the average rating by user U7 for items associated with source A is 3, which is within 1.5 points of the average overall rating by user U7 of 2.75 and which is greater than 2.2. It does, however, match the pattern discussed above with respect to item A4 when the threshold is set at 1.5 or more points below the average rating for an item. Similarly, the rating of item A4 by user U6 matches only one of the patterns discussed above. In contrast, the rating of item A4 by user U2 matches at least two of the patterns discussed above. Thus, in some embodiments the rating of item A4 by user U2 would be identified as fraudulent or otherwise unreliable, while the ratings of item A4 by users U6 and U7 would not be identified as fraudulent or otherwise unreliable. Similarly, in some embodiments the patterns discussed above with respect to FIG. 6 can be combined with other patterns, such as those discussed above with respect to FIGS. 4 and 5.

Figure 7:
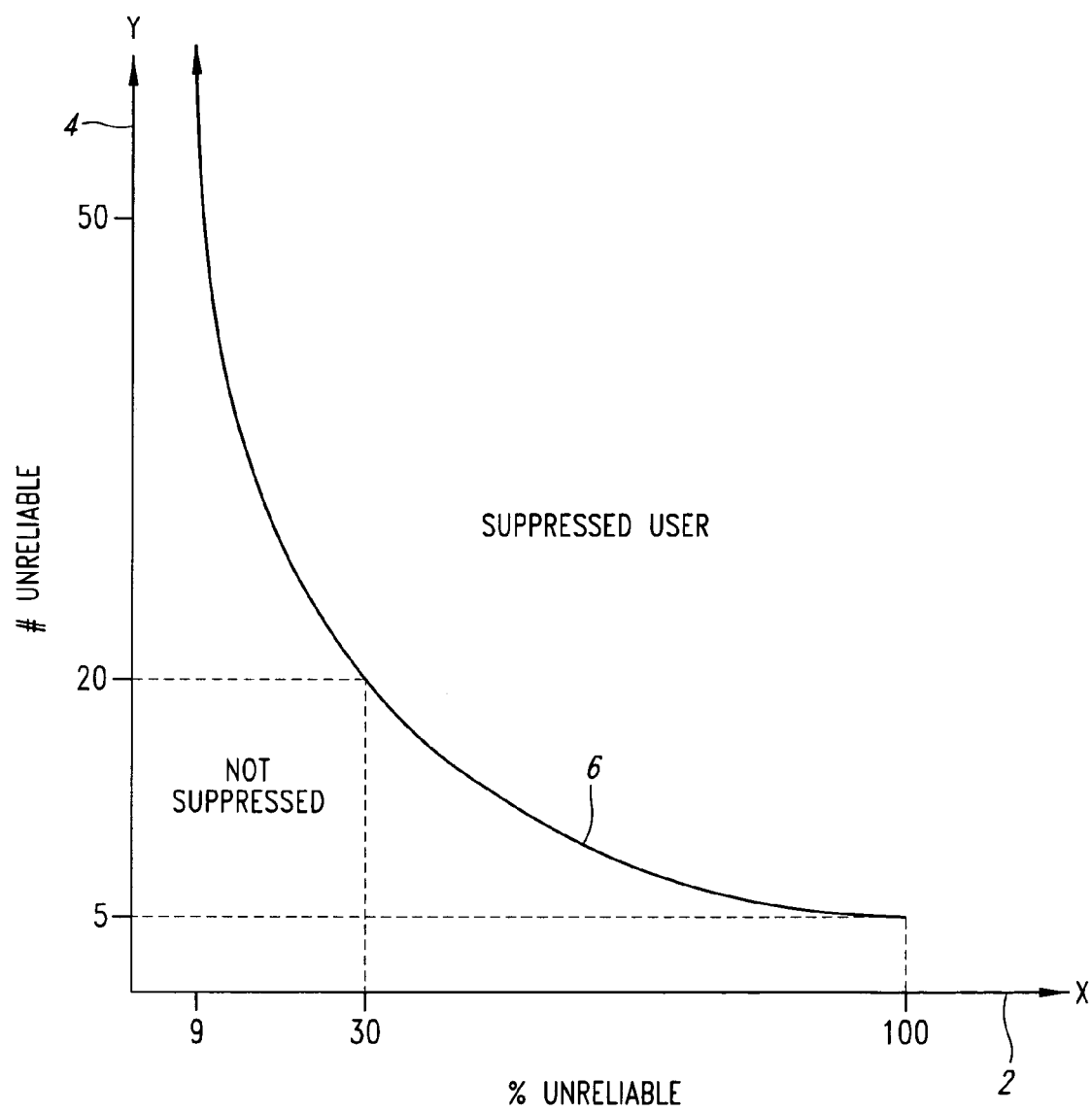
FIG. 7 is a graphical illustration of an example of a threshold curve for use in deciding whether to suppress reviews submitted by a user.

FIG. 7 is a chart illustrating an example threshold curve for use in deciding whether to suppress a particular user, such as to cause all ratings from the user to be excluded or otherwise ignored, or to instead only ignore some such ratings (e.g., all ratings that are received after the suppression decision is made). The x-axis 2 represents the percentage of ratings submitted by the user that have been identified as fraudulent or otherwise unreliable. The y-axis 4 represents the number of reviews submitted by the user that have been identified as fraudulent or otherwise unreliable. The curve 6 represents an embodiment of a threshold from which a particular user will be suppressed. In the embodiment of FIG. 7, when less than five reviews from a user are identified as fraudulent or unreliable, the user will not be globally suppressed, regardless of the percentage of the reviews from the user that are identified as fraudulent or unreliable. When a user has submitted only five reviews and all of them are identified as fraudulent or unreliable, however, the user will be suppressed. As the number of reviews submitted by a user and identified as fraudulent or unreliable increases, the percentage of fraudulent or unreliable reviews required for the threshold for global suppression of reviews from the user deceases. For example, in the embodiment illustrated in FIG. 7, when a user has submitted twenty or more reviews that have been identified as fraudulent or unreliable, the percentage required to reach the threshold curve 6 falls to 30 percent; and when a user has submitted fifty or more reviews identified as fraudulent or unreliable, the threshold is reached when this constitutes nine percent of the reviews submitted by the user. Some embodiments may suppress particular reviews submitted by a user even when the threshold for suppressing all reviews submitted by the user has not been reached.

Figure 8:
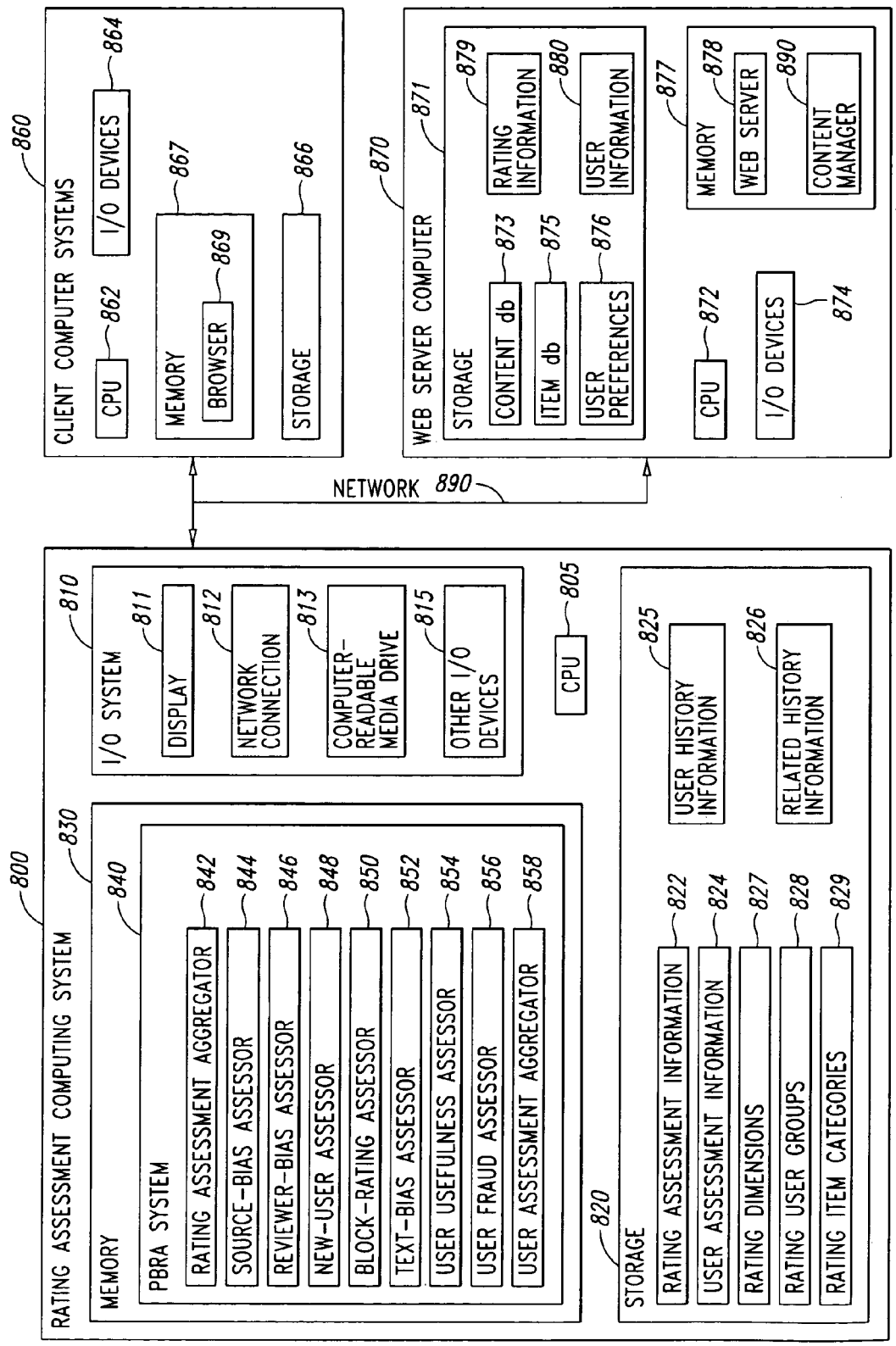
FIG. 8 is a functional block diagram of a system for evaluating the reliability of a user rating or review.

As an illustrative example, FIG. 8 illustrates a Rating Assessment ("RA") computing system 800 suitable for executing an embodiment of a Pattern-Based Reliability Assessor ("PBRA") system 840, as well as Web server computing systems 870 that can use rating-based information when selecting content to provide to users of client computer systems 860. As illustrated, the RA System 800, the Web Server computers 870 and the client computer systems 860 are coupled together by a network 890. The Rating Assessment computing system 800 includes a CPU 805, various I/O devices 810, storage 820, and memory 830, with the I/O devices illustrated in this example embodiment including a display 811, a network connection 812, a computer-readable media drive 813, and various other I/O devices 815. The Web Server computers 870 comprise a CPU 872, a memory 877, I/O devices 874 and storage 871. The Client computer systems 860 comprise a CPU 862, a memory 867, I/O devices 864, and storage 866. A browser 869 is illustrated executing in the memory 867.

The embodiment of the PBRA system 840 is executing in memory 830, and it includes a Rating Assessment Aggregator component 842, a Source-Bias Assessor component 844, a Reviewer-Bias Assessor component 846, a New-User Assessor component 848, a Block-Rating Assessor component 850, a Text-Bias Assessor component 852, a User Usefulness Assessor component 854, a User Fraud Assessor component 856, and a User-Assessment Aggregator component 858. The Rating Assessment Aggregator component 842 generates an aggregate reliability score for a particular user-supplied rating based on reliability scores for the user-supplied rating generated by the assessor components 844-852.

In particular, the PBRA system 840 receives a user rating, such as from a content manager system 890 executing in memory 877 of a Web server computer 870, or instead directly from a user of a client computer system 860, or by automatically identifying the rating as being of potential interest (e.g., in response to an aggregate reliability score of another rating submitted by the user). The rating may be, for example, a rating of an item available for purchase, such as a numerical rating of an item available for purchase, a Boolean rating of an item available for purchase or a textual review of an item available for purchase. The rating could also be, for example, a rating of content associated with an item, such as a rating of the usefulness of a textual review of the item by another user, and could take the form of, for example, a numerical rating, a Boolean rating or a textual review of the content associated with the item.

The PBRA system 840 then obtains multiple other ratings by the user, which in the illustrated embodiment are stored as user history information 825 on storage 820—in other embodiments, such ratings may instead be treated as independent pieces of content that are stored along with other content in a content database on storage of a Web server computer (e.g., to enable management of them by a content manager system 890), or the ratings may instead be stored together with a rated item or content, or in a manner otherwise associated with the rated item or content. In the illustrated embodiment, the PBRA system optionally also obtains information about multiple ratings by other users which are stored in the related history information 826. The multiple ratings by other users may comprise, for example, ratings by other users of an item when the user rating is a rating by the user of the item, or ratings by other users of a review of an item when the user rating is a rating by the user of the review of the item, and the obtained information may include the multiple ratings and/or a summary or aggregated version of the multiple ratings (e.g., a mean and standard deviation).

After the PBRA system 840 receives a user rating, the multiple other ratings by the user, and, optionally, the multiple ratings by other users, the system generates one or more aggregate assessments for the user rating, which in the illustrated embodiment are then provided to the content manager system 890 to be stored in a manner associated with the rating in the rating information 879. In other embodiments, the assessments could instead be stored by the PBRA system and provided to others upon request, or the PBRA system could instead dynamically calculate the aggregate assessment(s) for a user rating upon request based on whatever other ratings by the user, ratings by other users, and other related information is available at the time of the request.

The PBRA system 840 retrieves information from the rating assessment information 822 stored in the storage 820, such as, for example, information associated with a pattern indicating, for example, a user bias against or for a source for an item, a user bias against or for reviews associated with another user, a new user engaged in prolific new voting (which may indicate creation of a disposable account), a user engaged in block rating or voting, and/or inappropriate text in a review suggesting bias. The rating assessment information 822 may also comprise information such as, for example, minimum thresholds, such as a minimum number of ratings provided by a user that must be exceeded before an aggregate assessment indicating a rating is unreliable or fraudulent will be generated for a rating by the user.

In some embodiments, the PBRA system 840 may also optionally use other information when obtaining ratings and calculating aggregate assessments of user ratings, such as rating dimensions 827 that specify one or more dimensions for a rating (for any rating or ratings of a specified type), rating user groups 828 that specify groups or types of users for which groups of user ratings will be gathered and/or for which independent aggregate assessments of user ratings will be maintained (e.g., based on the independent groups of users), and rating item categories 829 that specify specific groups or types of items for which groups of user ratings will be gathered and/or for which independent assessments of user ratings will be maintained (e.g., based on the type of item reviewed).

In the illustrated embodiment, after receiving a user rating, the multiple other ratings by the user, and, optionally, the multiple ratings by other users, the system optionally generates one or more aggregate assessments for the user, which in the illustrated embodiment are then provided to the content manager system 890 to be stored in a manner associated with the user in the user information 880. In other embodiments, the assessments could instead be stored by the PBRA system and provided to others upon request, or the PBRA system could instead dynamically calculate the aggregate assessment (s) for a user upon request based on whatever other ratings by the user, ratings by other users, and other related information is available at the time of the request.

In some embodiments, the aggregate assessment(s) of a user include a user reputation rating score that is based on the quality of the user's ratings (e.g., measured with respect to their degree of agreement with other users' ratings), a user reputation ranking score that is based on both the quality and quantity of the user's ratings, and a user voting weight score to reflect how much weight ratings from that user are to receive.

In a similar manner to the assessment of a user rating by the Rating Assessment Aggregator component 842, the User Assessment Aggregator component 858 may generate an aggregate reliability score for a particular user based on reliability scores for the user generated by the assessor components 854-856. The assessor components 854-856 and/or the aggregator component 858 may obtain and analyze various information (e.g., information about assessed unreliability of ratings by the user; specific types of user assessment information 824 from storage; information about other activities of the user, such as with respect to one or more Web server computers 870 and/or one or more online retailers, including activities related to shopping-related transactions, to opening one or more accounts, to providing item reviews or otherwise interacting in manners other than providing ratings, etc.; other information about the user, such as from another computing system (not shown) to show a credit rating of the user and/or to indicate an assessed reputation of the user), such as for the User Fraud Assessor component 856 to provide an assessed likelihood that the user is engaging in fraudulent activity and for the User Usefulness Assessor component 854 to provide an assessment of the usefulness of item reviews provided by the user or of other information associated with the user. If the aggregate reliability score generated for a particular user is sufficiently low (or alternatively if a generated aggregate unreliability score is sufficiently high), the user may then be suppressed with respect to some or all further actions that the user may be allowed to take (e.g., by not allowing the user to provide additional ratings, or instead allowing such ratings to occur but ignoring them).

After the RA system 800 has generated the aggregate assessment(s) of the user rating and, optionally, the aggregate assessment(s) of the user, the content manager system 890 can then use those assessment in selecting user ratings for use in selecting content to provide to users, such as to select item review content to accompany other information about an item from a item database 875 that is provided to prospective purchasers. The providing of the content to the user may be performed in conjunction with a Web server that is responding to requests from users of client devices with Web browsers, and may also in some embodiments be performed in conjunction with various predefined user preferences 876 for those users.

Those skilled in the art will appreciate that computing systems 800, 860 and 870 are merely illustrative and are not intended to limit the scope of the present invention. Computing system 800 may instead be comprised of multiple interacting computing systems or devices, and may be connected to other devices that are not illustrated, including through one or more networks such as the Internet or via the World Wide Web. More generally, a "client" or "server" computing system or device may comprise any combination of hardware or software that can interact in the manners described, including (without limitation) desktop or other computers, network devices, PDAs, cellphones, cordless phones, devices with walkie-talkie and other push-to-talk capabilities, pagers, electronic organizers, Internet appliances, television-based systems (e.g., using set-top boxes and/or personal/digital video recorders), and various other consumer products that include appropriate inter-communication and computing capabilities. In addition, the functionality provided by the illustrated RA system components may in some embodiments be combined in fewer components or distributed in additional components. Similarly, in some embodiments the functionality of some of the illustrated components may not be provided and/or other additional functionality may be available.

Those skilled in the art will also appreciate that, while various elements are illustrated as being stored in memory or on storage while being used, these elements or portions of them can be transferred between memory and other storage devices for purposes of memory management and data integrity. Alternatively, in other embodiments some or all of the software modules and/or components may execute in memory on another device and communicate with the illustrated computing system via inter-computer communication. Some or all of the RA system components or data structures may also be stored (e.g., as software instructions or structured data) on a computer-readable medium, such as a hard disk, a memory, a computer network or other transmission medium, or a portable media article (e.g., a DVD or flash memory device) to be read by an appropriate drive or via an appropriate connection. Some or all of the RA system components and data structures can also be transmitted via generated data signals (e.g., by being encoded in a carrier wave or otherwise included as part of an analog or digital propagated signal) on a variety of computer-readable transmission mediums, including wireless-based and wired/cable-based mediums, and can take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 9:
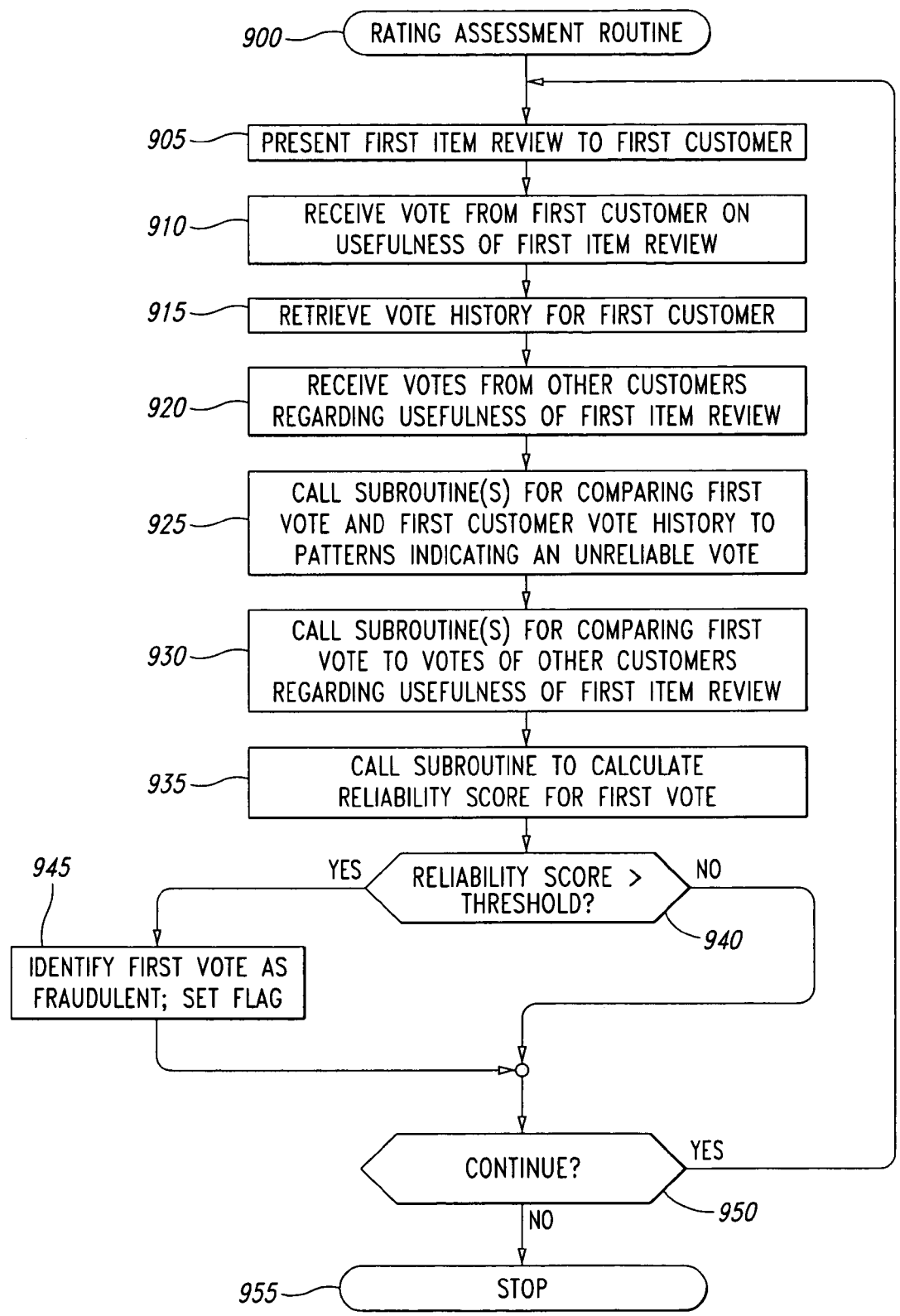
FIG. 9 is a flow diagram of an embodiment of a rating assessment routine.

FIG. 9 is a flow diagram of an example embodiment of a rating assessment routine 900 that may be employed by an RA system, such as the RA system 840 illustrated in FIG. 8. The routine 900 determines parameters to be used when analyzing a user rating, obtains other ratings by the user, obtains other ratings by other users, and assesses the user rating after sufficient analysis has occurred, with the assessment of the user rating then available for use by the system (e.g., to decide whether to display the user rating to appropriate readers and/or to decide whether to use the user rating in the selection of content to display to appropriate readers). While a user rating is assessed initially before being put into use in this illustrated embodiment, in other embodiments a similar routine could be invoked dynamically to provide current assessments for a user rating when requested based on whatever relevant information was available at that time.

The routine 900 begins at step 905, where a first item review is presented to a first customer. For example, with reference to FIG. 2, the item review 222 in display 200 may be presented to the first customer. The routine proceeds to step 910, where it receives a vote from the first customer on the first item review. For example, with reference to FIG. 2, the first customer may select one of the buttons 246, 248 to indicate whether the first customer found the item review 222 useful, or may select one of the buttons 252 to indicate a numerical rating of the usefulness of the review.

The routine 900 proceeds from step 910 to step 915, where it retrieves information regarding a vote history of the first customer. The routine 900 proceeds from 915 to 920 where it retrieves information regarding votes by other customers on the usefulness of the first item review.

The routine 900 proceeds from 920 to 925, where it calls one or more subroutines for evaluating the reliability of the first vote by comparing the first vote and the information regarding the vote history of the first customer to a plurality of patterns indicative of an unreliable vote. The routine proceeds from 925 to 930, where it calls one or more subroutines for evaluating the reliability of the first vote by comparing the first vote to the information regarding the votes by other customers on the usefulness of the first item review.

The routine 900 proceeds from step 930 to step 935, where it calls a subroutine to calculate a reliability score for the first vote. In some embodiments, the reliability score will be a weighted sum of variables returned from the subroutines called at steps 925 and 930. In some embodiments the reliability score may have multiple components, such as a first component based on variables returned from the one or more subroutines called at step 925 and a second component based on variables returned from the one or more subroutines called at step 930.

The routine 900 proceeds from step 935 to step 940, where it determines whether the reliability score exceeds a predefined unreliability threshold. For example, if the calculated reliability score is a weighted sum, the routine may compare the weighted sum to a predefined maximum weighted sum. In another example, if the calculated reliability score has two or more components, the routine may compare each of the components to a maximum score for the respective component. For some embodiments, such as when it is desired that erroneous decisions that a vote is unreliable should be avoided at the cost of allowing some unreliable votes to be considered, the routine may require that the maximum be exceeded for all or some portion of the components before a determination will be made that the reliability threshold has been exceeded.

When it is determined at step 940 that the reliability score for the first vote exceeds the predefined unreliability threshold, the routine proceeds from step 940 to step 945. At step 945, the routine identifies the first vote as fraudulent, for example, by setting a flag associated with the first vote. The identification of the first vote as fraudulent may be used, for example, by a content manager, to exclude the first vote from a group of votes used to evaluate the usefulness of the first item review. The routine proceeds from step 940 to step 950.

When it is determined at step 940 that the reliability score for the first vote does not exceed the predetermined reliability threshold, the routine 900 proceeds from step 940 to step 950. At step 950 the routine determines whether to continue presenting item reviews to customers for evaluation. When it is determined at step 950 to continue presenting item reviews to customers, the routine proceeds from step 950 to step 905. When it is not determined at step 950 to continue presenting item reviews to customers for evaluation, the routine proceeds from step 950 to step 955, where it stops.

Figure 10:
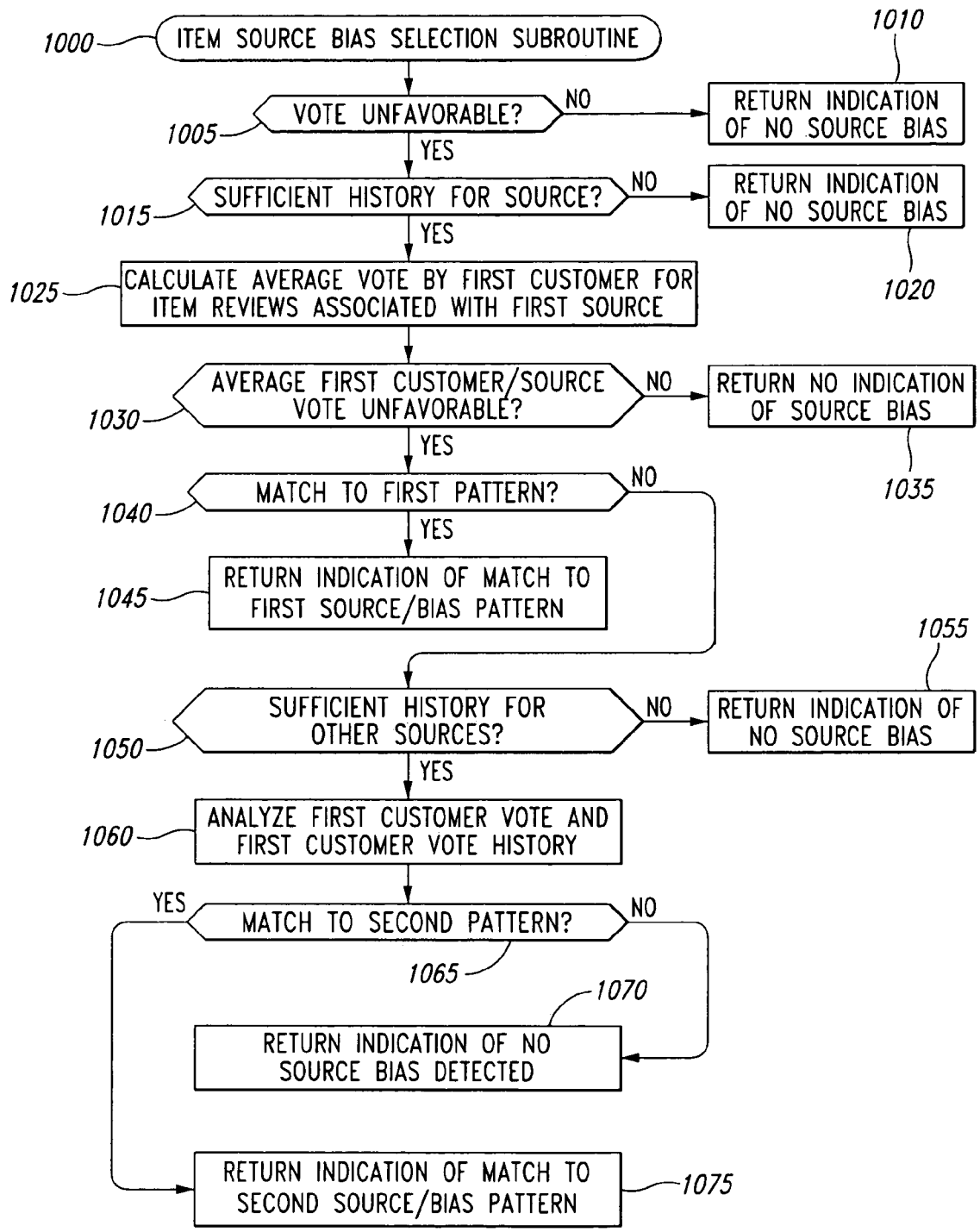
FIG. 10 is a flow diagram of an embodiment of an item source bias detection subroutine.

FIG. 10 is a flow diagram for an example embodiment of an item source bias detection subroutine 1000 for determining whether a customer's votes or other ratings regarding an item reflect a negative bias against a source associated with the item, although in other embodiments a bias related to any other type of information associated with an item may instead be analyzed (e.g., an item type, a brand, a color, a size, etc.). The subroutine 1000 may be called, for example, by step 925 of the routine 900 illustrated in FIG. 9, and may be passed certain information, such as the retrieved vote history for the customer. While not illustrated here, this or a similar subroutine may further identify other types of such biases, such as positive biases, biases with a bi-modal or other multi-modal pattern, etc.

The subroutine 1000 proceeds to step 1005, where it optionally determines whether the first vote is an unfavorable vote. For example, in some embodiments it may be desirable to not block any favorable votes. In some embodiments, the first vote is a Boolean YES/NO vote. The subroutine 1000 may determine that a YES vote is a favorable vote and a NO vote is an unfavorable vote. In other embodiments, the first vote may be a numerical ranking on a scale of, for example, 1 to 5. In such embodiments, the subroutine may determine that votes above a certain threshold, for example, 2, are favorable votes, and that votes at or below the threshold are unfavorable votes. If the subroutine determines at step 1005 that the first vote is not an unfavorable vote, the subroutine proceeds from step 1005 to step 1010, where it returns an indication that the first vote and the first customer history do not match a pattern for bias against a source associated with a reviewed item, as well as the value of any other desired variables.

When the subroutine determines at step 1005 that the first vote is an unfavorable vote, the subroutine proceeds to step 1015. At step 1015, the subroutine optionally determines whether there is a sufficient voting history of the first customer with respect to votes on the usefulness of reviews of items associated with the first source. For example, the subroutine may compare the number of votes from the first customer on reviews of items from the first source to a threshold number. In such embodiments, when the number of votes exceeds the threshold number, the subroutine may determine that the voting history contains a sufficient number of votes from the first customer with respect to the usefulness of item reviews of items from the first source.

When the subroutine determines at step 1015 that there is an insufficient number of votes from the first customer, the subroutine proceeds from step 1015 to step 1020, where it returns an indication that the first vote and the first customer history do not match a pattern for bias against a source associated with the reviewed item, as well as the value of any other desired variables.

When the subroutine determines at step 1015 that there are sufficient votes from the first customer on the usefulness of item reviews for items from the source, the subroutine proceeds from step 1015 to step 1025. At step 1025, the subroutine calculates an average vote by the first customer for item reviews of items associated with the source of the reviewed item. The subroutine may combine Boolean and numerical votes by, for example, using weights assigned to Boolean votes, or it may the treat Boolean and numerical votes separately. The subroutine 1000 proceeds from step 1025 to step 1030, where it determines whether the average vote by the first customer on item reviews for items from the source is unfavorable. In some embodiments, for example, the subroutine will determine whether the average vote is unfavorable by comparing the average vote to a threshold.

When it is determined that the average vote is not unfavorable, the subroutine proceeds from step 1030 to step 1035, where it returns an indication that the first vote and the first customer history do not match a pattern for bias against a source associated with a reviewed item, as well as the value of any other desired variables. When it is determined that the average vote by the first customer on item reviews for items from source of the reviewed item is unfavorable, the subroutine proceeds from step 1030 to step 1040.

At step 1040, the subroutine determines whether the vote history for the first customer matches a first pattern indicating bias against the first source in the form of a disposable account. For example, the subroutine could determine whether the number of votes in the first customer history on item reviews for items from other sources exceeds a first threshold value. The threshold value may be set at zero, for example, to correspond to a pattern indicating that the first customer is using a disposable account for the purpose of casting unfavorable votes on items or item reviews associated with the first source.

When it is determined at step 1040 that the vote history for the first customer matches the first pattern, the subroutine proceeds to step 1045. This determination may be made, for example, by determining that a number of votes in the first customer history for item reviews from other sources does not exceed the first threshold. At step 1045, the subroutine returns an indication of a match of the first customer vote history to a first pattern indicating a bias against a source associated with the item, as well as the value of any other desired variables. When it is determined that the vote history for the first customer does not match the first pattern, the subroutine proceeds to step 1050.

At step 1050, the subroutine determines whether the vote history for the first customer contains a sufficient number of votes from the first customer on item reviews associated with items from other sources. This determination can be made, for example, by determining whether the number of such votes in the first customer history exceeds a second threshold value. The second threshold value may be selected, for example, for the purpose of ensuring there is a sufficient sample size to make a comparison of the average vote by the first customer on item reviews associated with the first source to item reviews from the first customer for items associated with other sources.

When it is determined at step 1050 that there are not sufficient votes in the first customer history on item reviews of items associated with other sources, the subroutine proceeds from step 1050 to step 1055, where it returns an indication that the first vote and the first customer history do not match a pattern for bias against a source associated with a reviewed item, as well as the value of any other desired variables. When it is determined that there are sufficient votes in the first customer history on item reviews of items associated with other sources, the subroutine proceeds from step 1050 to step 1060.

At step 1060, the subroutine analyzes the first customer vote history. In some embodiments, the subroutine analyzes the vote history by calculating an average vote by the first customer for item reviews of items associated with sources other than the source associated with the first item. The subroutine may combine Boolean and numerical votes by, for example, using weights assigned to Boolean votes, or it may the treat Boolean and numerical votes separately. The subroutine 1000 proceeds from step 1060 to step 1065.

At step 1065, the subroutine determines whether a comparison of the first vote to the first customer vote history matches a second pattern indicating a bias against the first source. In some embodiments, this determination can be made, for example, by determining whether the difference between an average calculated at step 1060 and the average calculated at step 1025 exceeds a second threshold value. For example, if the average calculated at step 1060 is 3.5, and the average calculated at step 1025 is 1.25, and the second threshold value is 2, it would be determined that the first customer vote history matches the second pattern.

When it is determined at step 1065 that the first vote and the first customer vote history does not match the second pattern, the subroutine proceeds to step 1070, where it returns an indication that the first vote and the first customer history do not match a pattern for bias against a source associated with a reviewed item, as well as the value of any other desired variables. When it is determined that the first vote and the first customer vote history match the second pattern, the subroutine proceeds to step 1075, where it returns an indication of a match to the second pattern indicating a bias against a source associated with a reviewed item, as well as the value of any other desired variables.

Figure 11:
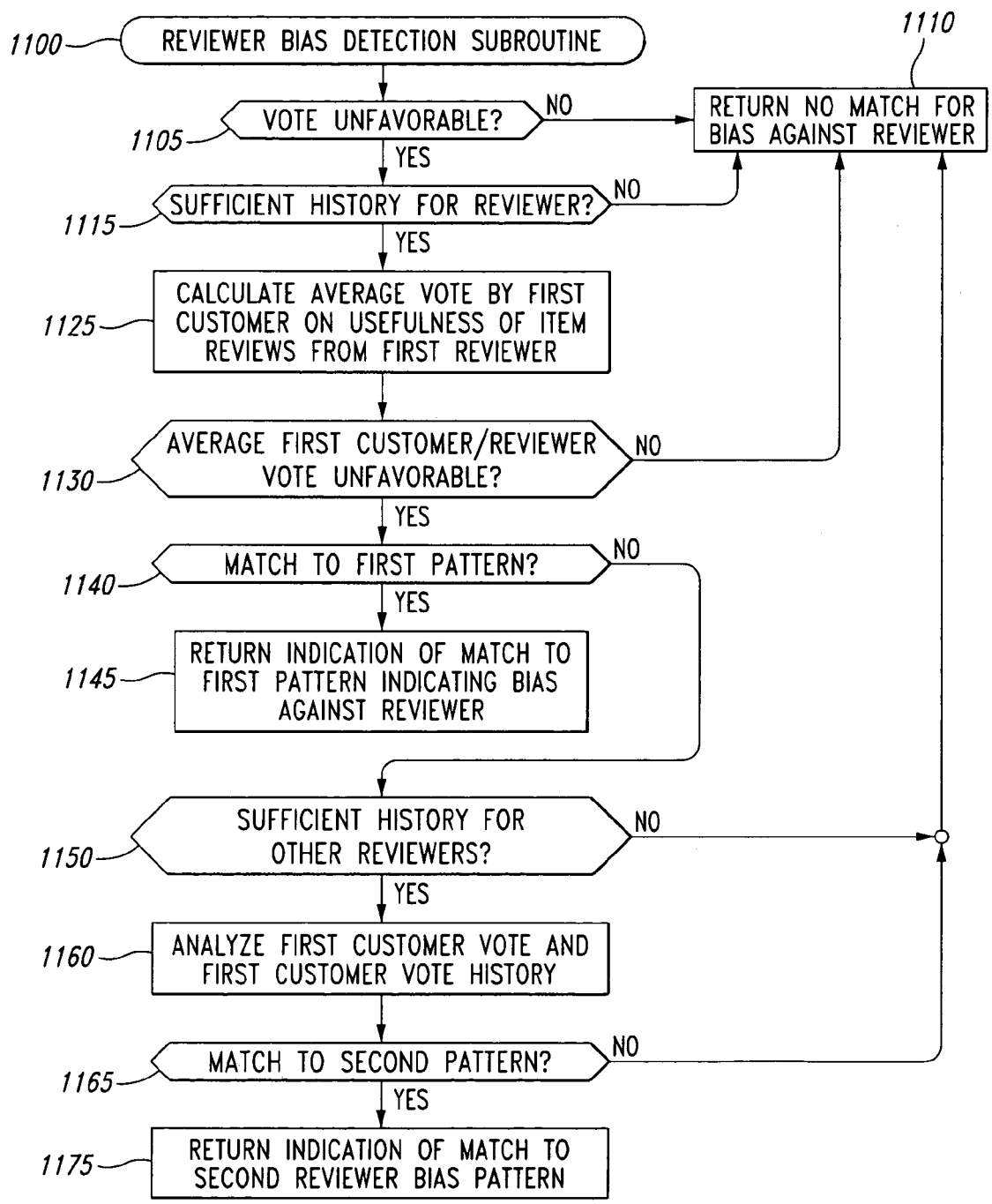
FIG. 11 is a flow diagram of an embodiment of a reviewer bias detection subroutine.

FIG. 11 is a flow diagram for an example embodiment of a bias detection subroutine 1100 for determining whether a customer's votes or other ratings reflect a negative bias against a reviewer submitting item review. The first reviewer may be, for example, a second distinct customer, and in other embodiments may be engaged in activities other than providing item reviews (e.g., providing items, providing content, etc.). The subroutine 1100 may be called, for example, by step 925 of the routine 900 illustrated in FIG. 9, and may be passed certain information, such as the retrieved vote history for the customer. While not illustrated here, this or a similar subroutine may further identify other types of such biases, such as positive biases, biases with a bi-modal or other multi-modal pattern, etc.

The subroutine 1100 proceeds to step 1105, where it optionally determines whether the first vote is an unfavorable vote. For example, as discussed above with regard to FIG. 10, in some embodiments it may be desirable to not block any favorable votes. If the subroutine determines at step 1105 that the first vote is not an unfavorable vote, the subroutine proceeds from step 1105 to step 1110, where it returns an indication that the first vote and the first customer history do not match a pattern for bias against a reviewer, as well as the value of any other desired variables.

When the subroutine determines at step 1105 that the first vote is an unfavorable vote, the subroutine proceeds to step 1115. At step 1115, the subroutine optionally determines whether there is a sufficient voting history of the first customer with respect to votes on the usefulness of reviews submitted by the first reviewer. For example, the subroutine may compare the number of such votes from the first customer to a threshold number. In such embodiments, when the number of votes exceeds the threshold number, the subroutine may determine that the voting history contains a sufficient number of votes from the first customer with respect to the usefulness of item reviews submitted by the first reviewer.

When the subroutine determines at step 1115 that there is an insufficient number of votes from the first customer with respect to the usefulness of item reviews submitted by the first reviewer, the subroutine proceeds from step 1115 to step 1110, where it returns an indication that the first vote and the first customer history do not match a pattern for bias against a reviewer, as well as the value of any other desired variables.

When the subroutine determines at step 1115 that there are sufficient votes from the first customer on the usefulness of item reviews submitted by the first reviewer, the subroutine proceeds from step 1115 to step 1125. At step 1125, the subroutine calculates an average vote by the first customer on the usefulness of item reviews submitted by the first reviewer. The subroutine may combine Boolean and numerical votes by, for example, using weights assigned to Boolean votes, or it may the treat Boolean and numerical votes separately. The subroutine 1100 proceeds from step 1125 to step 1130, where it determines whether the average vote by the first customer on item reviews from the first reviewer is unfavorable. In some embodiments, for example, the subroutine will determine whether the average vote is unfavorable by comparing the average vote to a threshold.

When it is determined that the average vote is not unfavorable, the subroutine proceeds from step 1130 to step 1110, where it returns an indication that the first vote and the first customer history do not match a pattern for bias against a reviewer, as well as the value of any other desired variables. When it is determined that the average vote by the first customer on item reviews submitted by the first reviewer is unfavorable, the subroutine proceeds from step 1130 to step 1140.

At step 1140, the subroutine determines whether the vote history for the first customer matches a first pattern indicating bias against a reviewer. For example, the subroutine could determine whether the number of votes in the first customer history on item reviews submitted by other reviewers exceeds a first threshold value or whether the ratio between the number of votes by the first customer on item reviews from the first reviewer and the number of votes by the first customer on item reviews from other reviewers exceeds a threshold ratio. The threshold value or ratio may be set low, for example, to correspond to a pattern indicating that the first customer is using a disposable account for the purpose of casting unfavorable votes on items or item reviews associated with the first source.

When it is determined at step 1140 that the vote history for the first customer matches the first pattern, the subroutine proceeds to step 1145. This determination may be made, for example, by determining that a number of votes in the first customer history for item reviews from other reviewers does not exceed the first threshold. At step 1145, the subroutine returns an indication of a match of the first customer vote and the first customer vote history to a first pattern indicating a bias against a reviewer, as well as the value of any other desired variables. When it is determined that the vote history for the first customer does not match the first pattern, the subroutine proceeds to step 1150.

At step 1150, the subroutine determines whether the vote history for the first customer contains a sufficient number of votes from the first customer on item reviews submitted by other reviewers. This determination can be made, for example, by determining whether the number of such votes in the first customer history exceeds a second threshold value. The second threshold value may be selected, for example, for the purpose of ensuring there is a sufficient sample size to make a comparison of the average vote by the first customer on item reviews associated with the first source to item reviews from the first customer for items associated with other sources.

When it is determined at step 1150 that there are not sufficient votes in the first customer history on item reviews submitted by other reviewers, the subroutine proceeds from step 1150 to step 1110, where it returns an indication that the first vote and the first customer history do not match a pattern for bias against a reviewer, as well as the value of any other desired variables. When it is determined that there are sufficient votes in the first customer history on item reviews submitted by other reviewers, the subroutine proceeds from step 1150 to step 1160.

At step 1160, the subroutine analyzes the first customer vote and the first customer vote history. In some embodiments, the analysis includes calculating an average vote by the first customer for item reviews submitted by other item reviewers. The subroutine may combine Boolean and numerical votes by, for example, using weights assigned to Boolean votes, or it may the treat Boolean and numerical votes separately. The subroutine 1100 proceeds from step 1160 to step 1165.

At step 1165, the subroutine determines whether a comparison of the first vote to the first customer vote history matches a second pattern indicating a bias against a reviewer. This determination can be made, for example, by determining whether the difference between an average calculated at step 1160 and the average calculated at step 1125 exceeds a second threshold value. For example, if the average calculated at step 1160 is 3.5, and the average calculated at step 1125 is 1.25, and the second threshold value is 2, it would be determined that the first customer vote history matches the second pattern.

When it is determined at step 1165 that the first vote and the first customer vote history does not match the second pattern, the subroutine proceeds to step 1110. When it is determined that the first vote and the first customer vote history match the second pattern, the subroutine proceeds to step 1175, where it returns an indication of a match to the second pattern indicating a bias against a reviewer, as well as the value of any other desired variables.

Figure 12:
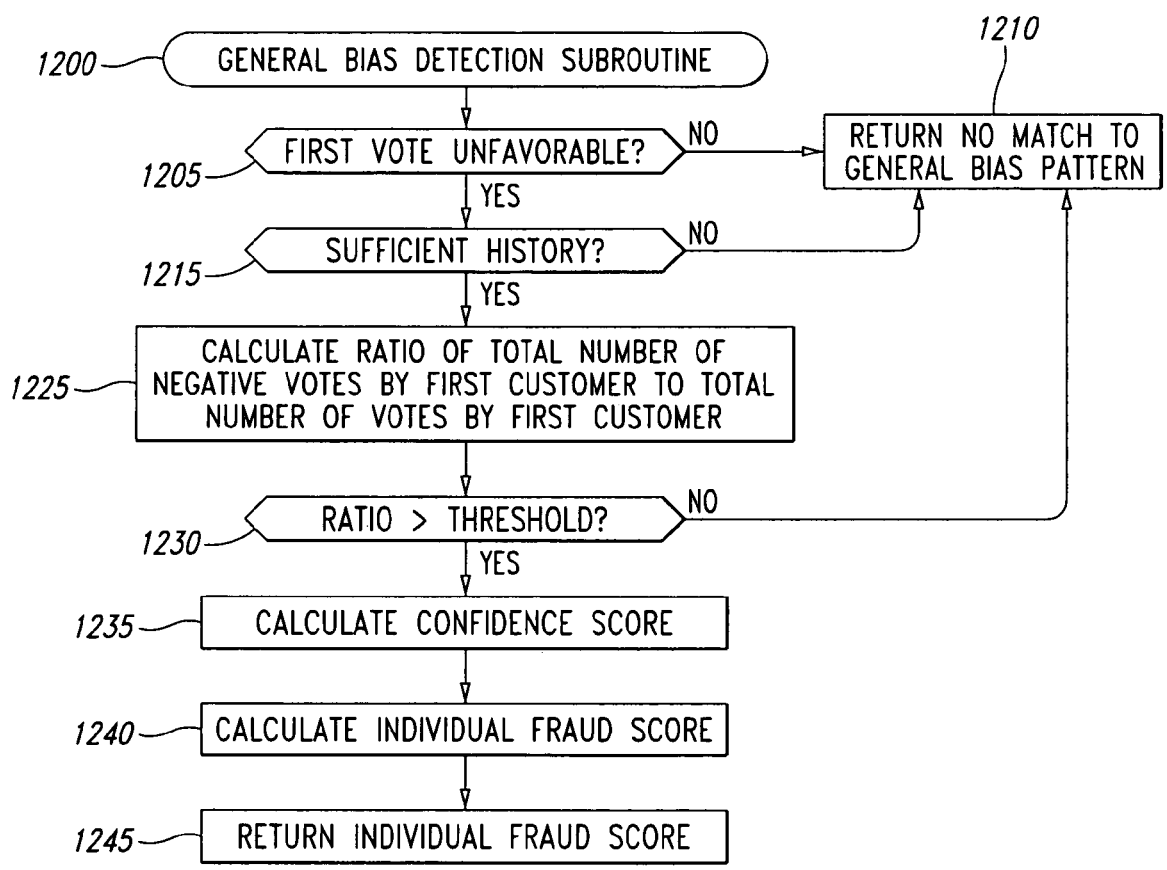
FIG. 12 is a flow diagram of an embodiment of a general bias detection subroutine.

FIG. 12 is a flow diagram for an example embodiment of a bias detection subroutine 1200 for determining whether a customer's votes or other ratings have a general negative bias against item reviews, although in other embodiments a bias related to other types of information or other targets being rated may instead be analyzed. The subroutine 1200 may be called, for example, by step 925 of the routine 900 illustrated in FIG. 9, and may be passed certain information, such as the retrieved vote history for the customer. While not illustrated here, this or a similar subroutine may further identify other types of such biases, such as positive biases, biases with a bi-modal or other multi-modal pattern, etc.

The subroutine 1200 proceeds to step 1205, where it optionally determines whether the first vote is an unfavorable vote. For example, as discussed above with regard to FIG. 10, in some embodiments it may be desirable to not block any favorable votes. If the subroutine determines at step 1205 that the first vote is not an unfavorable vote, the subroutine proceeds from step 1205 to step 1210, where it returns an indication that the first vote and the first customer history do not match a pattern for general bias against item reviews, as well as the value of any other desired variables.

When the subroutine determines at step 1205 that the first vote is an unfavorable vote, the subroutine proceeds to step 1215. At step 1215, the subroutine optionally determines whether there is a sufficient voting history of the first customer with respect to votes on the usefulness of item reviews. For example, the subroutine may compare the number of such votes from the first customer to a threshold number. In such embodiments, when the number of votes exceeds the threshold number, the subroutine may determine that the voting history contains a sufficient number of votes from the first customer with respect to the usefulness of item reviews.

When the subroutine determines at step 1215 that there is an insufficient number of votes from the first customer with respect to the usefulness of item reviews, the subroutine proceeds from step 1215 to step 1210, where it returns an indication that the first vote and the first customer history do not match a pattern for general bias against item reviews, as well as the value of any other desired variables.

When the subroutine determines at step 1215 that there are sufficient votes from the first customer on the usefulness of item reviews, the subroutine proceeds from step 1215 to step 1225. At step 1225, the subroutine calculates a ratio of the total number of negative votes by the first customer regarding the usefulness of item reviews to the total number of votes by the first customer regarding the usefulness of item reviews. The subroutine proceeds from step 1225 to step 1230. At step 1230, the subroutine determines whether the ratio calculated at step 1225 exceeds a predefined threshold ratio.

When it is determined at step 1230 that the calculated ratio does not exceed the predefined threshold ratio, the subroutine proceeds from step 1230 to step 1210. When it is determined that the calculated ratio exceeds the predefined threshold ratio (in other words, when it is determined that the first customer history matches a pattern for general bias against item reviews), the subroutine proceeds from step 1230 to step 1235.

At step 1235, the subroutine optionally calculates a confidence score for a determination that the first customer has a general bias against item reviews. In one embodiment, the confidence score CFGB may be calculated according to:

$$CFGB = \ln(TV)/\ln(CT), \qquad (1)$$

where TV is the total number of votes cast by the first customer regarding the usefulness of item reviews and CT is a confidence threshold. The subroutine proceeds from step 1235 to step 1240, where it optionally calculates an individual fraud score IFS for the first vote by the first customer. In one embodiment, the individual fraud score IFS may be calculated according to:

$$IFS = R*CFGB \qquad (2)$$

where R is the ratio calculated at step 1225. The subroutine proceeds from step 1240 to step 1245, where it returns the individual fraud score and the value of any other desired variables. The individual fraud score serves as an indication that the first vote and the first customer vote history match a pattern indicating the first customer has a general bias against item reviews. The subroutine illustrated in FIG. 12 could be readily modified to check for general bias in other types or ratings or reviews, such as a general bias against a type of item or a general bias in all ratings or reviews submitted by a customer.

Figure 13:
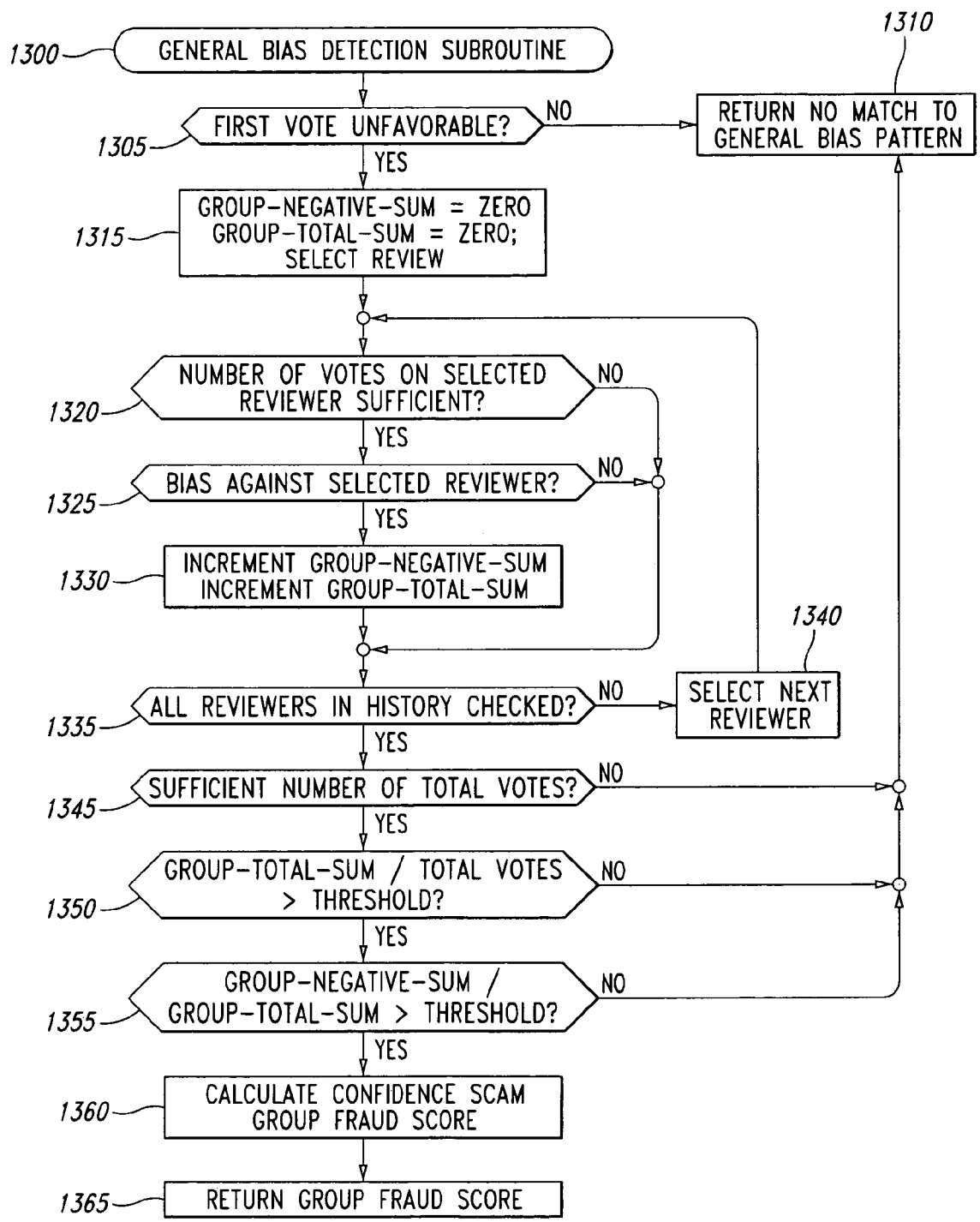
FIG. 13 is a flow diagram of an embodiment of a general bias detection subroutine.

FIG. 13 is a flow diagram for an example embodiment of a bias detection subroutine 1300 for determining whether a customer's votes or other ratings have a general negative bias against item reviews from a group of several reviewers, although in other embodiments a bias related to other types of targets and/or other types of groups of users may instead be analyzed. The subroutine 1300 may be called, for example, by step 925 of the routine 900 illustrated in FIG. 9, and may be passed certain information, such as the retrieved vote history for the customer. While not illustrated here, this or a similar subroutine may further identify other types of such biases, such as positive biases, biases with a bi-modal or other multi-modal pattern, etc.

The subroutine 1300 proceeds to step 1305, where it optionally determines whether the first vote is an unfavorable vote. For example, as discussed above with regard to FIG. 10, in some embodiments it may be desirable to not block any favorable votes. If the subroutine determines at step 1305 that the first vote is not an unfavorable vote, the subroutine proceeds from step 1305 to step 1310, where it returns an indication that the first vote and the first customer history do not match a pattern for general bias against item reviews, as well as the value of any other desired variables.

When the subroutine determines at step 1305 that the first vote is an unfavorable vote, the subroutine proceeds to step 1315. At step 1315, the subroutine initializes variables used to detect a match to a pattern indicating a general bias against reviews. In the illustrated embodiment, the subroutine sets a group-negative-sum variable and a group-total-sum variable to zero and selects a reviewer from the first customer voting history. The subroutine proceeds from step 1315 to step 1320. At step 1320 the subroutine determines whether the total number of votes from the first customer on reviews submitted by the selected reviewer is sufficient. This can be determined, for example, by comparing the number of such votes to a threshold value.

When it is determined at step 1320 that sufficient votes were submitted with respect to the selected reviewer, the subroutine proceeds from step 1320 to step 1325. When it is determined at step 1320 that sufficient votes were not submitted with respect to the selected reviewer, the subroutine proceeds to step 1335.

At step 1325, the subroutine determines whether the first customer has a bias against the selected reviewer, by, for example, determining whether a ratio of the number of negative votes by the first customer on reviews by the selected reviewer to the total number of votes by the first customer on reviews by the selected reviewer exceeds a threshold value. When it is determined at step 1325 that the first customer has a bias against the selected reviewer, the subroutine proceeds from step 1325 to step 1330. When it is determined at step 1325 that the first customer does not have a bias against the selected reviewer, the subroutine proceeds from step 1325 to step 1335.

At step 1330, the subroutine increments the group-negative-sum by the total number of negative votes cast by the first customer on reviews submitted by the first reviewer and increments the group-total-sum by the total number of votes cast by the first customer on reviews submitted by the first reviewer and proceeds to step 1335.

At step 1335, the subroutine determines whether it has analyzed the vote history for all reviewers in the first customer vote history. When the subroutine determines at step 1335 that it has not analyzed the vote history for all reviewers in the first customer vote history, the subroutine proceeds to step 1340, where it selects an unanalyzed reviewer vote history and returns to step 1320. When the subroutine determines at step 1335 that it has analyzed the vote history for all reviewers in the first customer vote history, the subroutine proceeds to step 1345.

At step 1345, the subroutine determines whether there is a sufficient number of votes in the total number of votes cast by the first customer with respect to reviewers against which the first customer was determined to have a bias. This can be determined by comparing the group-total-sum to a threshold value. When it is determined at step 1345 that there is an insufficient number of votes, the subroutine proceeds to step 1310. When it is determined at step 1345 that there is a sufficient number of votes, the subroutine proceeds to step 1350. At step 1350, the subroutine determines whether a ratio of the number of votes on item reviews by reviewers against which a bias was detected to the total number of votes cast by the first customer on item reviews is sufficient, by, for example, comparing the ratio to a threshold. When it is determined at step 1350 that the ratio is insufficient, the subroutine proceeds from 1350 to 1310. When it is determined at step 1350 that the ratio is sufficient, the subroutine proceeds to step 1355.

At step 1355, the subroutine determines whether a group-ratio of the group-negative-sum to the group-total-sum exceeds a threshold value. When it is determined at step 1355 that the group-ratio does not exceed the threshold value, the subroutine proceeds to step 1310. When it is determined at step 1355 that the group-ratio exceeds the threshold value, the subroutine proceeds to step 1360. At step 1360, the subroutine calculates a confidence score CS according to:

$$CS = \ln(\text{group-sum-total})/\ln(\text{group-confidence-threshold}) \qquad (3)$$

where the group-confidence-threshold is selected so that the confidence score CS equals one when the confidence group-sum-total equals the group-confidence-threshold. This will cause the confidence score CS to fall exponentially when the group-sum-total is less that the group-confidence-threshold and to rise logarithmically when the group-sum-total is more than the group-confidence-threshold.

At step 1360, the subroutine also calculates a group fraud score GF according to:

$$GF = (\text{group-ratio})(CS) \qquad (4).$$

The subroutine proceeds from step 1360 to step 1365, where it returns the group fraud score GF and the value of any other desired variables. The group fraud score serves as an indication that the first customer vote and the first customer history matched a pattern for general bias against item reviews. The subroutine 1300 illustrated in FIG. 13 may be readily modified to determine whether a customer has a general bias against, for example, authors of books, or sources of items.

Figure 14:
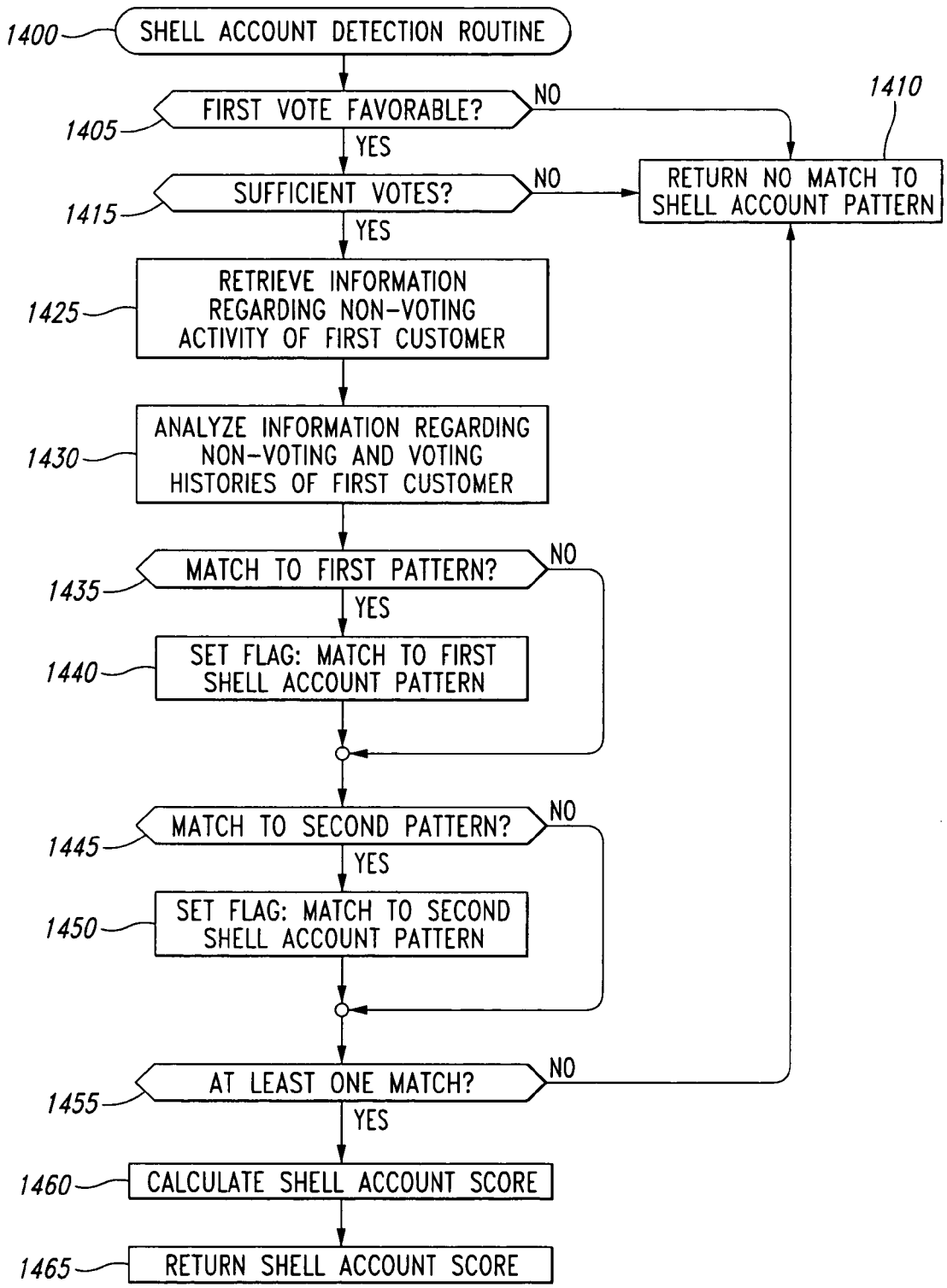
FIG. 14 is flow diagram of an embodiment of a shell account detection subroutine.

FIG. 14 is a flow diagram for an example embodiment of a bias detection subroutine 1400 for determining whether a customer's votes or other ratings regarding an item reflect use of a shell account by the customer to artificially show a positive bias, although in other embodiments a variety of other types of information related to a user may instead be analyzed. The subroutine 1400 may be called, for example, by step 925 of the routine 900 illustrated in FIG. 9, and may be passed certain information, such as the retrieved vote history for the customer. While not illustrated here, this or a similar subroutine may further identify other types of such biases, such as negative biases, biases with a bi-modal or other multi-modal pattern, etc.

The subroutine 1400 proceeds to step 1405, where it optionally determines whether the first vote is an unfavorable vote. For example, as discussed above with regard to FIG. 10, in some embodiments it may be desirable to not block any favorable votes. If the subroutine determines at step 1405 that the first vote is not an unfavorable vote, the subroutine proceeds from step 1405 to step 1410, where it returns an indication that the first vote and the first customer history do not match a pattern for a shell voting account, as well as the value of any other desired variables.

When the subroutine determines at step 1405 that the first vote is an unfavorable vote, the subroutine proceeds to step 1415. At step 1415, the subroutine optionally determines whether there is a sufficient voting history of the first customer with respect to votes on the usefulness of item reviews. For example, the subroutine may compare the number of such votes from the first customer to a threshold number. In such embodiments, when the number of votes exceeds the threshold number, the subroutine may determine that the voting history contains a sufficient number of votes from the first customer with respect to the usefulness of item reviews.

When the subroutine determines at step 1415 that there is an insufficient number of votes from the first customer with respect to the usefulness of item reviews, the subroutine proceeds from step 1415 to step 1410, where it returns an indication that the first vote and the first customer history do not match a pattern for a shell account, as well as the value of any other desired variables.

When the subroutine determines at step 1415 that there are sufficient votes from the first customer on the usefulness of item reviews, the subroutine proceeds from step 1415 to step 1425. At step 1425, the subroutine retrieves a non-voting history for the first customer. The non-voting history may include, for example, a timeline of purchases made by the first customer. The subroutine proceeds from step 1425 to step 1430.

At step 1430, the subroutine analyzes the voting and non-voting histories of the first customer. In some embodiments, the analysis may include calculating a ratio of voting activity to non-voting activity within one or more predefined time periods, calculating an average level of non-voting activity within one or more predefined time periods and calculating a total score for the non-voting history of the first customer. The subroutine proceeds from step 1430 to step 1435.

At step 1435, the subroutine optionally determines whether the analysis of the voting and non-voting histories matches a first pattern indicating the first customer is using a shell account by, for example, determining whether the total score for the non-voting history of the first customer does not exceed a threshold value. The threshold value may be set low, for example, at zero, to match a pattern indicating the first customer has not engaged in any non-voting activity.

When it is determined at step 1435 that the first customer vote and first customer voting history match the first pattern, the subroutine proceeds to step 1440. At step 1440, the subroutine 1400 sets a flag indicating that a match to a first pattern consistent with a shell account was matched. The subroutine proceeds from step 1440 to step 1445. When it is determined at step 1435 that the first customer vote and the first customer voting history do not match the first pattern, the subroutine proceeds from step 1435 to step 1445.

At step 1445, the subroutine determines whether the first customer vote and the first customer vote history match a second pattern indicative of the first customer using a shell account. This determination can be made, for example, by determining whether a ratio of the first customer's voting history activity to the first customer's non-voting history over a first predefined time period exceeds a threshold ratio. When it is determined at step 1445 that the first customer vote and the first customer vote history match the second pattern, the subroutine proceeds from step 1445 to step 1450, where a flag is set indicating a match to the second shell account pattern and the subroutine proceeds from step 1450 to step 1455. When it is determined at step 1445 that the first customer vote and the first customer vote history do not match the second pattern, the subroutine proceeds from step 1445 to step 1455.

At step 1455, the subroutine determines whether a match to at least one pattern indicated the first customer is using a shell account was detected. This can be determined, for example, by determining whether one of the two flags was set. When it is determined at step 1455 that there was no match to at least one pattern indicating the first customer is using a shell account, the subroutine proceeds to step 1410. When it is determined at step 1455 that at least one match to a pattern indicating the first customer is using a shell account, the subroutine proceeds to step 1460. At step 1460, the subroutine calculates a shell-account-fraud score based on the patterns to which a match was detected. For example, in some embodiments the subroutine may assign a value of 1 to a match to the first pattern and a value of two to a match to the second pattern. In such embodiments, the shell-account fraud score is set forth in Table 1, below.

TABLE 1

| Match to First Pattern? | Match to Second Pattern | Shell-Account Fraud Score |
|---|---|---|
| Yes | No | 1 |
| No | Yes | 2 |
| Yes | Yes | 3 |

The subroutine proceeds from step 1460 to step 1465, where it returns the shell account fraud score and the value of any other desired variables. The subroutine illustrated in FIG. 14 may be readily modified to check for matches to additional patterns indicating a customer is using a shell account.

Figure 15:
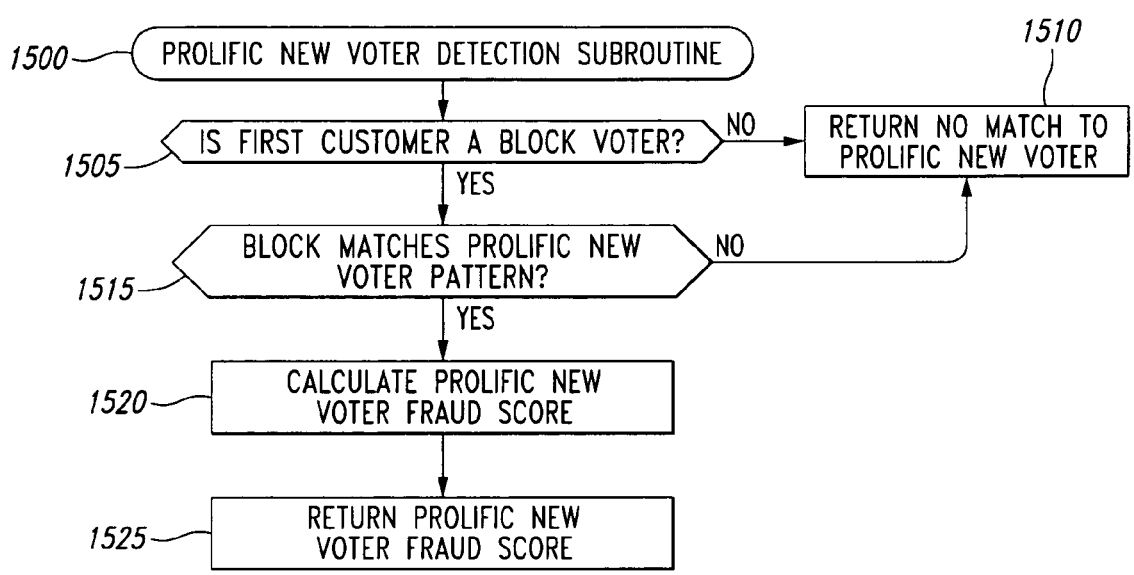
FIG. 15 is a flow diagram of an embodiment of a prolific new voter detection subroutine.

FIG. 15 is a flow diagram of an embodiment of a new-prolific voter detection subroutine 1500 for determining whether a customer's votes or other ratings indicate that the customer is a new-prolific voter, although in other embodiments a variety of other types of activities by a user may instead be analyzed. The subroutine 1500 may be called by, for example, by step 1635 of the subroutine 1600 illustrated in FIG. 16, and may be passed certain information, such as the retrieved vote history for the first customer or information regarding an identified block of votes.

Figure 16:
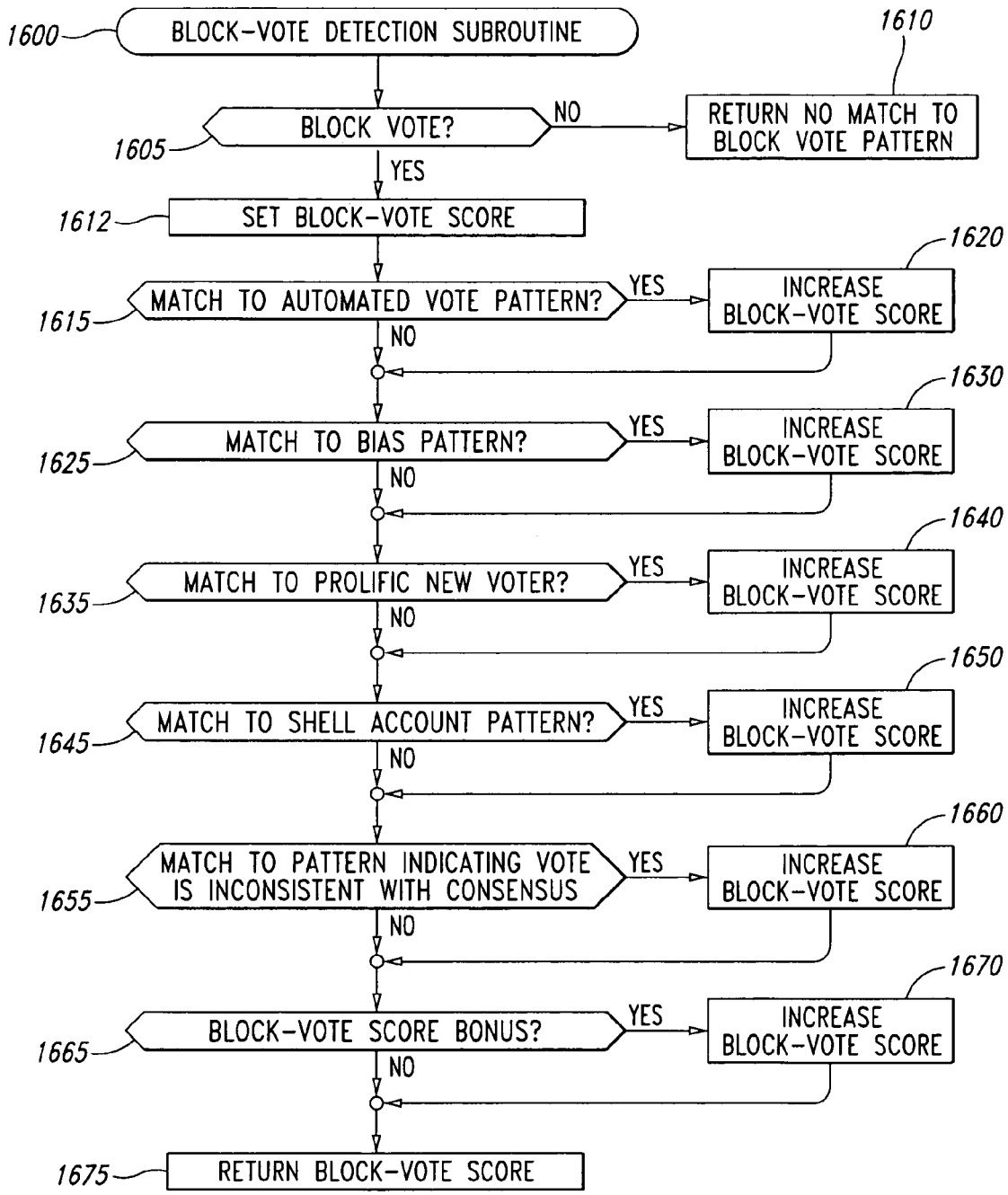
FIG. 16 is a flow diagram of an embodiment of a block vote detection subroutine.

The subroutine proceeds from step 1500 to step 1505, where it optionally determines whether the vote has been identified as part of a block of votes (see FIG. 5 and subroutine 1600 in FIG. 16). When it is determined at step 1505 that the first customer has not been identified as a block voter, the subroutine proceeds to step 1510, where it returns an indication that the vote does not match a pattern for a prolific new voter. When it is determined at step 1505 that the vote has been identified as part of a block vote, the subroutine proceeds from step 1505 to step 1515.

At step 1515, the subroutine determines whether the block of votes matches a pattern indicating the first customer is a prolific new voter. This can be determined, for example, by determining whether the first vote in the block of votes occurred within a threshold time period of the very first vote by the first customer. For example, with regard to vote $V_{27}$ in FIG. 5, in one embodiment the subroutine would determine whether the first vote in the block of votes associated with vote $V_{27}$ (vote $V_9$) occurred within a threshold time period of vote $V_0$. When it is determined at step 1515 that the block of votes does not match the prolific new voter pattern, the subroutine proceeds from step 1515 to step 1510. When it is determined at step 1515 that the block of votes matches the prolific new voter pattern, the subroutine proceeds from step 1515 to step 1520.

At step 1520, the subroutine calculates a prolific new voter fraud score. In some embodiments, the prolific new voter fraud score may be a constant, for example, of one when a match is detected. In some embodiments, for example, the prolific new voter fraud score may be a function of the number of votes in the block. The subroutine proceeds from step 1520 to step 1525, where it returns the value of the prolific new voter fraud score and any other desired variables.

FIG. 16 is a flow diagram of an example embodiment of a block-voter detection subroutine 1600 for determining whether a customer's vote or other rating is part of a block vote by the customer, although in other embodiments a group of multiple votes may instead be analyzed together. Because block voting itself may not be a strong indicator that a vote is fraudulent or unreliable, the illustrated embodiment of the subroutine also checks for other indications of unreliability or fraud and returns a fraud score based on the presence or absence of these other indications. The subroutine 1600 may be called, for example, by step 925 of the routine 900 illustrated in FIG. 9, and may be passed certain information, such as the retrieved vote history for the customer.

The subroutine 1600 begins at step 1605, where it determines whether the vote is within a block of votes. This may be done, for example, by determining whether the number of votes cast by the customer with a predefined time period prior to the casting of the vote by the customer exceeds a predefined threshold. In some embodiments, a potential block of votes may be defined as including any votes occurring within a predetermined time window of an adjacent vote and the subroutine may check whether the number of votes within a potential block exceeds a threshold. When it is determined at step 1605 that the vote is not part of a block vote, the subroutine proceeds to step 1610, where it returns an indication that the vote does not match a pattern for block voting. When it is determined at step 1605 that the vote is part of a block vote, the subroutine proceeds from step 1605 to step 1612, where it sets an initial value for a block-vote score. The initial value may be, for example, one. The subroutine proceeds from step 1612 to step 1615.

At step 1615, the subroutine determines whether the block of votes matches a pattern indicating the block of votes is being submitted by automated or mechanical means. This can be determined, for example, by comparing the vote history of the first customer to patterns indicating the rate of voting is too fast for a user to perform without use of an automated process. For example, the average time between votes in the block of votes can be compared to a threshold value. When it is determined at step 1615 that a match to a pattern indicating automated voting exists, the subroutine proceeds from step 1615 to step 1620, where it increases the block-vote score to reflect a match to the pattern indicating automated voting. For example, the subroutine may increase the block-vote score by a number, such as four, to reflect the high likelihood that automated voting is not a reliable indicator of a customer's true evaluation of an item or of an item review. When it is determined at step 1615 that a match to a pattern indicating automated voting does not exist, the subroutine proceeds from step 1615 to step 1625.

At step 1625, the subroutine determines whether there is a match for a pattern indicating bias. This may be determined, for example, by calling one or more subroutines, such as the subroutines discussed above with respect to FIGS. 10 through 13, or by analyzing indications returned by a subroutine. When it is determined at step 1625 that a match exists to a pattern indicating bias, the subroutine proceeds to step 1630, where it increases the block-vote score to reflect a match to a bias pattern. The amount of the increase can be selected to reflect the increased likelihood that the vote is unreliable based on the match to a bias pattern. The subroutine proceeds from step 1630 to step 1635. When it is determined at step 1625 that a match does not exist to a pattern indicating bias, the subroutine proceeds to step 1635.

At step 1635, the subroutine determines whether there is a match for a pattern indicating the customer is a prolific new voter. This may be determined, for example, by calling one or more subroutines, such as the subroutine discussed above with respect to FIG. 15, or by analyzing indications returned by a subroutine. When it is determined at step 1635 that a match exists to a pattern indicating a prolific new voter, the subroutine proceeds to step 1640, where it increases the block-vote score to reflect a match to a prolific new voter pattern. The amount of the increase can be selected to reflect the increased likelihood that the vote is unreliable based on the match to a prolific new voter pattern. The subroutine proceeds from step 1640 to step 1645. When it is determined at step 1635 that a match does not exist to a pattern indicating a prolific new voter, the subroutine proceeds to step 1645.

At step 1645, the subroutine determines whether there is a match for a pattern indicating the customer is using a shell account. This may be determined, for example, by calling one or more subroutines, such as the subroutine discussed above with respect to FIG. 14, or by analyzing indications returned by a subroutine. When it is determined at step 1645 that a match exists to a pattern indicating shell account usage, the subroutine proceeds to step 1650, where it increases the block-vote score to reflect a match to a shell account pattern. The amount of the increase can be selected to reflect the increased likelihood that the vote is unreliable based on the match to a shell account pattern. The subroutine proceeds from step 1650 to step 1655. When it is determined at step 1645 that a match does not exist to a pattern indicating bias, the subroutine proceeds to step 1655.

At step 1655, the subroutine determines whether there is a match for a pattern indicating the customer's vote is inconsistent with the consensus of other customers. This may be determined, for example, by calling one or more subroutines, such as the subroutines discussed below with respect to FIG. 18, or by analyzing indications returned by a subroutine. When it is determined at step 1655 that a match exists to a pattern indicating inconsistency with a consensus of other voters, the subroutine proceeds to step 1660, where it increases the block-vote score to reflect a match to a pattern indicating inconsistency with a consensus. The amount of the increase can be selected to reflect the increased likelihood that the vote is unreliable based on the match to a pattern indicating inconsistency with a consensus. The subroutine proceeds from step 1660 to step 1665. When it is determined at step 1655 that a match does not exist to a pattern indicating inconsistency with a consensus, the subroutine proceeds to step 1665.

At step 1665, the subroutine the subroutine determines whether the block vote should be further increased to reflect that multiple patterns indicating the vote is unreliable were detected. This may be determined, for example, by setting flags at steps 1620, 1630, 1640, 1650 and 1660 and comparing the number of set flags to a threshold, or by comparing the block-vote score to a threshold value. When it is determined at step 1665 that the block vote should be further increased, the subroutine proceeds to step 1670, where it increases the block-vote score to reflect that multiple patterns indicating the vote is unreliable were detected. The amount of the increase can be selected to reflect the increased likelihood that the vote is unreliable based on the match to multiple patterns. The subroutine proceeds from step 1670 to step 1675. When it is determined at step 1655 that the block-vote score should not be further increased, the subroutine proceeds to step 1675. At step 1675, the subroutine returns the value of the block-vote score, as well as the value of any other desired variables. The subroutine illustrated in FIG. 16 can be readily modified to address any other indications of unreliability that might be more likely to indicate fraudulent or unreliable voting when detected in combination with block voting.

Figure 17:
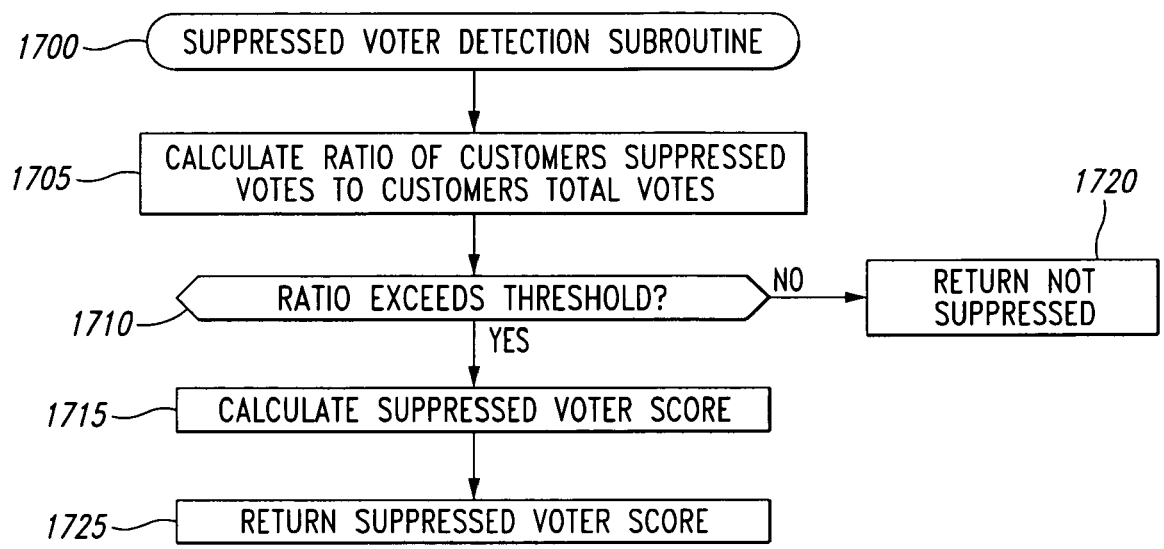
FIG. 17 is a flow diagram of an embodiment of a suppressed voter detection subroutine.

FIG. 17 is a flow diagram of an example embodiment of suppressed voter detection subroutine 1700 for determining whether a customer frequently submits unreliable votes although in other embodiments a variety of other types of actions by users may instead be analyzed. The subroutine 1700 may be called, for example, by step 925 of the routine 900 illustrated in FIG. 9, and may be passed certain information, such as the retrieved vote history for the customer.

The subroutine 1700 begins at step 1705, where it calculates a ratio of the number of votes submitted by the customer that were previously suppressed to the total number of votes submitted by the customer. The subroutine proceeds from step 1705 to step 1710, where it determines whether the ratio calculated at step 1705 exceeds a threshold value. When the subroutine determines at step 1710 that the ratio exceeds the threshold value, the subroutine proceeds to step 1715. When the subroutine determines at step 1710 that the ratio does not exceed the threshold value, the subroutine proceeds to step 1720, where it returns an indication that the vote does not match a pattern for a suppressed customer.

At step 1715, the subroutine calculates a suppressed voter score to indicate a match to a suppressed customer pattern. The suppressed voter score may be a fixed score (a constant) or it may reflect the extent to which the ratio exceeds the threshold value. The subroutine proceeds from step 1715 to step 1725, where it returns the value of the suppressed voter score, as well as the value of any other desired variables.

Figure 18:
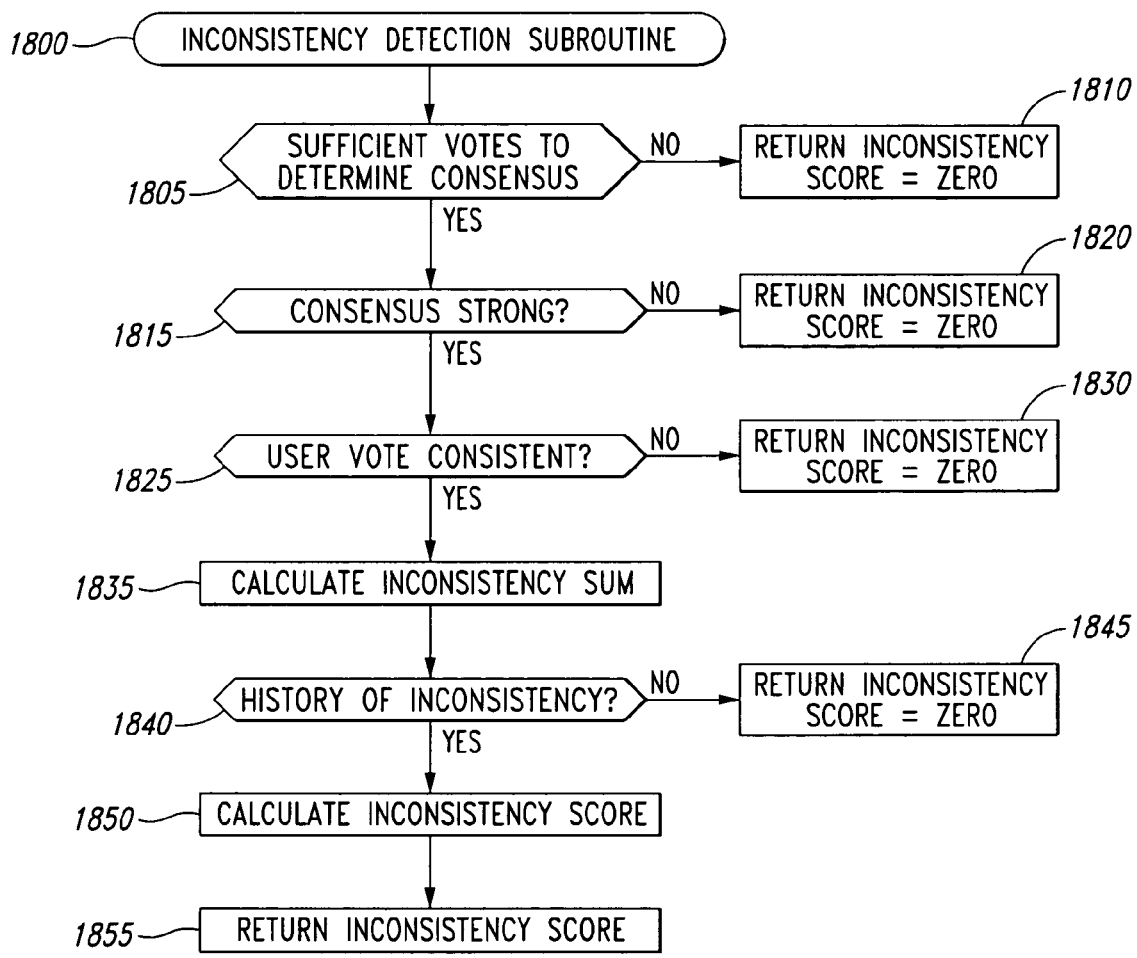
FIG. 18 is a flow diagram of an inconsistency detection subroutine.

FIG. 18 is a flow diagram of an example embodiment of an inconsistent vote pattern detection subroutine 1800 for comparing a vote by a customer on an item review to a consensus of votes on the item review by other users (although in other embodiments other types of ratings on other types of targets may instead be analyzed), and returns an inconsistency score reflecting whether the vote matches one or more patterns indicating the vote is inconsistent with a consensus of votes by other users. The subroutine also optionally checks whether other votes by the user are inconsistent with a corresponding consensuses reached by other users, and adjusts the inconsistency score accordingly. For example, in some embodiments it may be preferable not to exclude a user vote as inconsistent unless the user has a history of casting inconsistent votes. The subroutine 1800 may be called, for example, by step 930 in the subroutine of FIG. 9 or by step 1655 in the subroutine illustrated in FIG. 16.

The subroutine 1800 starts at step 1805, where it determines whether sufficient votes exist to calculate a consensus vote of other users. For example, when the vote is a vote by a customer on an item review or an item, the subroutine may determine this by comparing the number of votes by other customers on the item review or item to a threshold value. When it is determined at step 1805 that sufficient votes exist, the subroutine proceeds to step 1815. When it is determined at step 1805 that sufficient votes do not exist, the subroutine proceeds to step 1810, where it returns an indication that a match to a pattern indicating inconsistency with a consensus was not found, such as a zero inconsistency score.

At step 1815, the subroutine optionally determines whether the consensus is a strong consensus. This may be desired in some embodiments so as to limit the rejection of votes on the basis that a vote is inconsistent with a consensus to those cases where there is a strong consensus. Whether a strong consensus exists can be determined, for example, by determining whether the average corresponding vote by other users is within a predetermined percentage of the maximum and minimum vote range. When it is determined at step 1815 that there is a strong consensus, the subroutine proceeds to step 1825. When it is determined at step 1815 that there is not a strong consensus, the subroutine proceeds to step 1820, where it returns an indication that the vote does not match a pattern indicating inconsistency with a consensus, such as an inconsistency score of zero.

At step 1825, the subroutine determines whether the user vote is consistent with the consensus. This may be determined, for example, by determining whether the user vote is within a threshold range of the consensus vote average. When it is determined at step 1825 that the user vote is consistent with the consensus, the subroutine proceeds to step 1830, where it returns an indication that the vote does not match a pattern indicating inconsistency with a consensus, such as an inconsistency score of zero. When it is determined at step 1825 that the user vote is inconsistent with the consensus, the subroutine proceeds to step 1835, where it optionally calculates an inconsistency sum ISUM for the user vote. In some embodiments, the inconsistency sum ISUM may be calculated according to equation 5:

$$ISUM = \ln(\text{total \# votes in consensus}) / \ln(\text{threshold \# of votes for consensus}). \tag{5}$$

The use of a logarithmic transform will give greater weight to a stronger consensus. The subroutine proceeds from step 1835 to step 1840.

At step 1840, the subroutine optionally determines whether the user has a history of inconsistency sufficient to justify identifying the user vote as matching a pattern indicating the user's votes are generally inconsistent with the consensus of other users. In some embodiments, this may be done by determining whether the total number of prior votes in which the user vote is inconsistent with a corresponding consensus vote exceeds a threshold value. In some embodiments, this may be done by additionally determining whether a ratio of a sum of the inconsistency sums ISUM for all votes by the user that are inconsistent with a consensus to a total number of votes in which the user is inconsistent with a consensus exceeds a threshold value. When it is determined that the user does not have a history of inconsistency sufficient to justify excluding the user vote, the subroutine proceeds to step 1845, where it returns an indication that the user vote does not match a pattern for a user who consistently votes inconsistently with a consensus, such as an inconsistency score of zero. When it is determined that the user has a sufficient history of votes inconsistent with a consensus, the subroutine proceeds to step 1850, where it calculates an inconsistency score for the user vote. In some embodiments, the inconsistency score may be calculated by dividing the total number of votes on which the user vote is inconsistent with a corresponding consensus by a sum of the inconsistency sums ISUM for votes by the user that are inconsistent with a corresponding consensus.

The subroutine proceeds from step 1850 to step 1855, where it returns the inconsistency score calculated at step 1850, as well as the value of any other desired variables.

Figure 19:
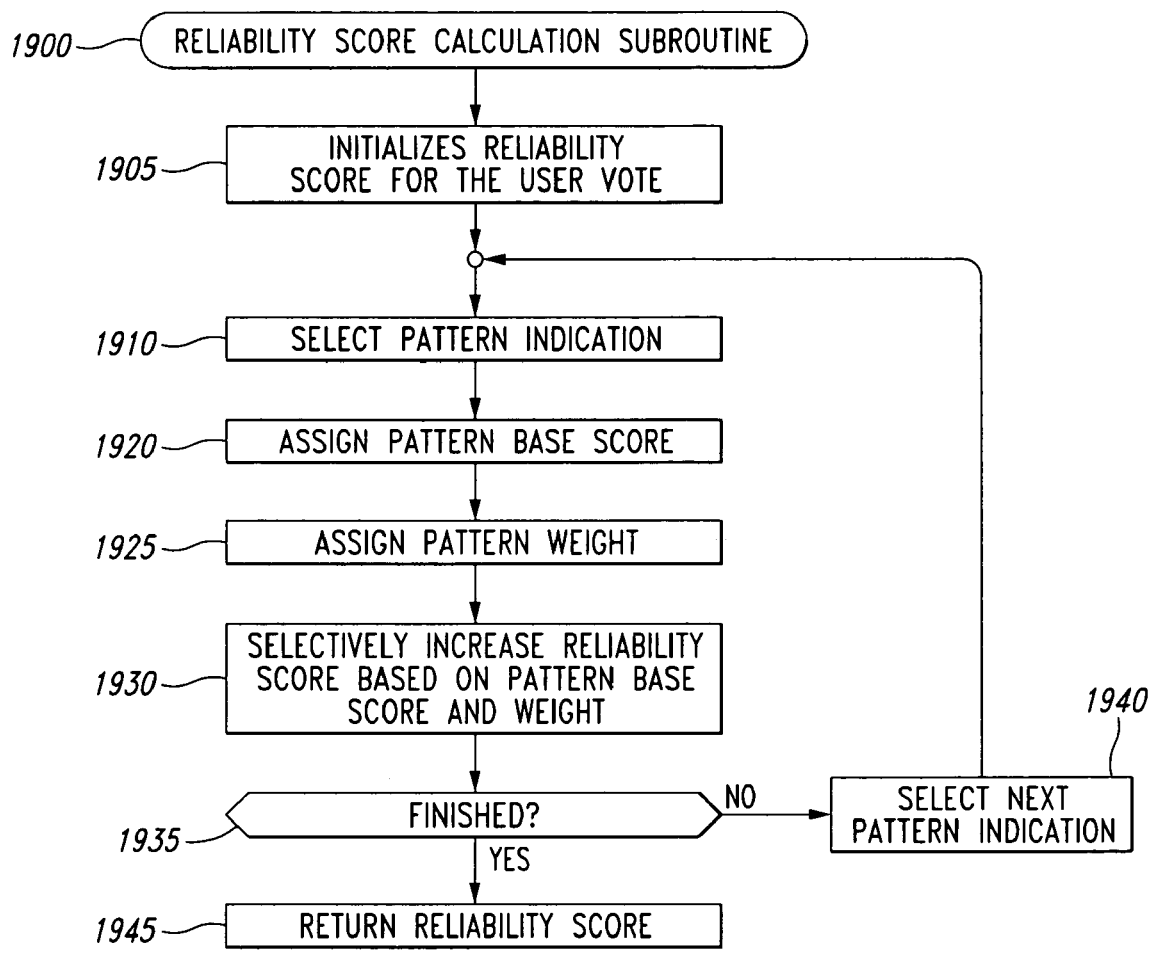
FIG. 19 is a flow diagram of a reliability score calculation subroutine.

FIG. 19 illustrates a reliability score calculation subroutine 1900 for calculating an overall reliability score for a user vote or other rating, such as a vote by a user on the usefulness of an item review, although in other embodiments other types of ratings on other types of targets may instead be analyzed. The subroutine 1900 may be called, for example, by step 935 of the rating assessment routine illustrated in FIG. 9.

The subroutine starts at step 1905, where it initializes a reliability score for the user vote and proceeds to step 1910. At step 1910, the subroutine selects a pattern indication to evaluate for an impact on the reliability score of the user vote. The pattern indication may be, for example, an indication of a match to a source bias pattern returned by a source-bias pattern detection subroutine, an indication of a match to a reviewer bias pattern returned by a reviewer bias pattern detector, an individual fraud score returned by a general bias detection subroutine; a group fraud score returned by a general bias detection subroutine, a shell account score returned by a shell account detection subroutine, a prolific new voter fraud score returned by a prolific new voter detection subroutine, a block vote score returned by a block vote detection subroutine, a suppressed voter score returned by a suppressed voter detection subroutine or an inconsistency score returned by an inconsistency detection subroutine.

The subroutine proceeds to step 1920 where it assigns a base score for the selected pattern indication based on the selected pattern and a value of the indication. For some pattern indications, the base score may be the value of the selected pattern indication. For other pattern indications, the base score may be a fixed value based on whether the value of the selected pattern indication exceeds a specified threshold. Various formulas and/or look up tables may be employed to assign a base score to the selected pattern indication. The base score for one pattern indication may vary based in part on another pattern indication. For example, the base score for a general bias pattern indication indicating a match may be higher if a block vote pattern indication indicates a match to a block vote pattern.

The subroutine proceeds from step 1920 to step 1925, where it optionally assigns a pattern weight to the selected pattern indication. The pattern weight may be, for example, based on the selected pattern, the base score, and/or the value of other pattern indications. Various formulas and/or look up tables may be employed to assign a pattern weight to the selected pattern indication.

The subroutine proceeds from step 1925 to step 1930, where it selectively increases the reliability score for the vote based on the pattern indication base score and weight. For example, in some embodiments the reliability score may be increased by an amount equal to the base score multiplied by the weight. The subroutine proceeds from step 1930 to step 1935, where it determines whether all desired pattern indications have been selected. When it is determined that not all desired pattern indications have been selected, the subroutine proceeds to step 1940, where it selects the next desired pattern indication and returns to step 1910. When it is determined that all desired pattern indications have been selected, the subroutine proceeds from step 1935 to step 1945, where it returns the reliability score for the selected vote.

Figure 20:
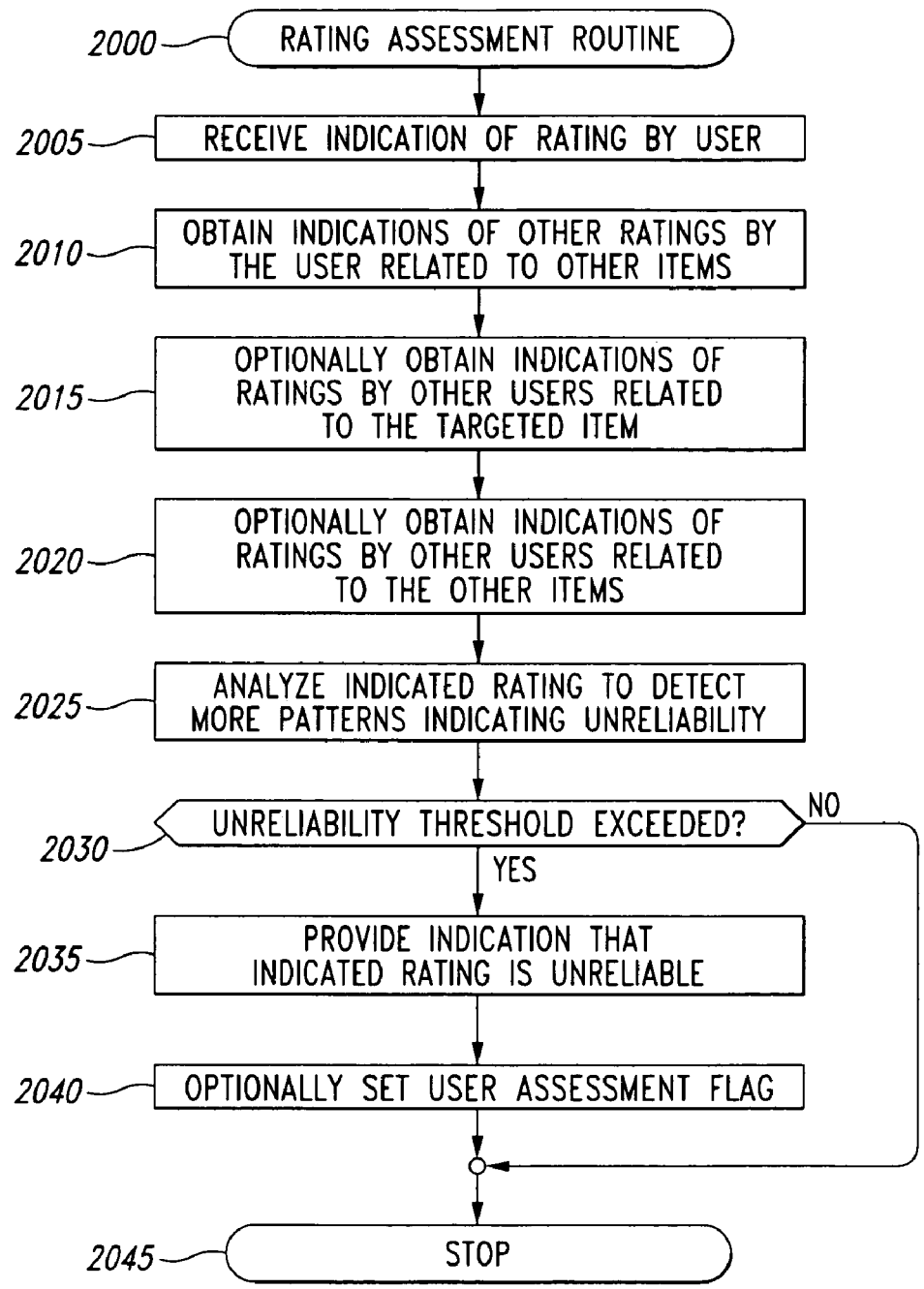
FIG. 20 is a flow diagram of an embodiment of a rating assessment routine.

FIG. 20 is a flow diagram of an example embodiment of a rating assessment routine 2000 that may be employed by an RA system, such as the RA system 840 illustrated in FIG. 8. The routine 2000 determines parameters to be used when analyzing a user rating, obtains other ratings by the user, obtains other ratings by other users, and assesses the user rating after sufficient analysis has occurred, with the assessment of the user rating then available for use by the system (e.g., to decide whether to display the user rating to appropriate readers and/or to decide whether to use the user rating in the selection of content to display to appropriate readers). A user rating may be accessed initially before being put into use in this illustrated embodiment, or this embodiment could be invoked dynamically to provide current assessments for a user rating when requested based on whatever relevant information was available at that time.

The routine 2000 begins at step 2005, where the routine receives an indication of a rating that reflects an evaluation by a user related to a target item. The evaluation may be, for example, an evaluation of the target item or an evaluation of a review of the target item. The rating may include a numerical rating and/or a Boolean rating.

The routine 2000 proceeds from step 2005 to step 2010, where it obtains one or more indications of multiple other ratings by the user that reflect evaluations related to other items. The routine proceeds from step 2010 to step 2015, where it optionally obtains one or more indications of multiple other ratings by other users that reflect evaluations related to the target item. The routine proceeds from step 2015 to step 2020, where it optionally obtains one or more indications of multiple other ratings by other users that reflect evaluations related to the other items.

The routine proceeds to step 2025 where it analyzes the evaluation of indicated rating and the evaluations of the other ratings to detect one or more patterns reflecting an unreliability of the indicated rating. The routine 2025 may call one or more subroutines, such as the subroutines similar to those illustrated in FIGS. 10 through 18, to conduct the analysis with respect to detecting one or more patterns reflecting an unreliability of the indicated rating.

The routine 2000 proceeds from step 2025 to step 2030 where it determines whether an unreliability of the indicated rating based on the detection of one or more patterns is sufficient to exceed an unreliability threshold. When it is determined at step 2030 that an unreliability of the indicated rating based on the detection of one or more patterns is sufficient to exceed an unreliability threshold, the routine proceeds to step 2035. When it is determined at step 2030 that an unreliability of the indicated rating based on the detection of one or more patterns is not sufficient to exceed an unreliability threshold, the routine proceeds to step 2045.

At step 2035, the routine provides an indication that the indicated rating is unreliable by, for example, setting a flag associated with the indicated rating. The routine proceeds from step 2035 to step 2040, where it optionally sets a flag indicating a user assessment may be appropriate to assess whether all votes by the user should be considered unreliable. In some embodiments, it may be desirable to flag a user for assessment when the unreliability of the indicated rating exceeds a certain threshold or when a particular pattern or combinations of patterns are detected, such as when a block voting and a shell account pattern are detected. The routine proceeds from step 2040 to step 2045, where it stops.

Figure 21:
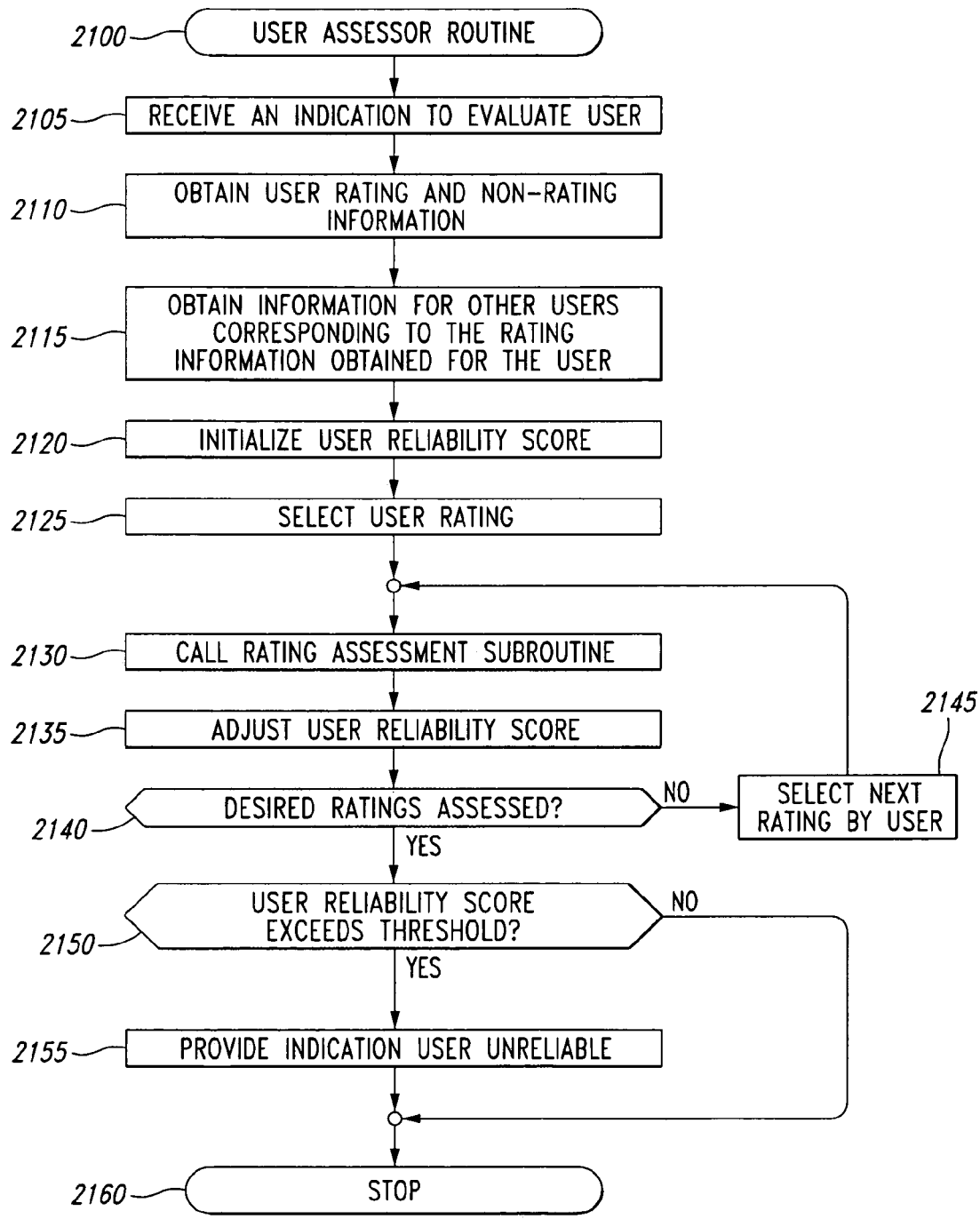
FIG. 21 is a flow diagram of an embodiment of a user assessment routine.

FIG. 21 is a flow diagram of an example embodiment of a user assessment routine 2100 that may be employed by an RA system, such as the RA system 840 illustrated in FIG. 8. The routine 2100 determines parameters to be used when analyzing a user, obtains ratings by the user, obtains other ratings by other users, and assesses the user after sufficient analysis has occurred, with the assessment of the user then available for use by the system (e.g., to decide whether to display ratings from the user to appropriate readers and/or to decide whether to use ratings from the user in the selection of content to display to appropriate readers). A user may be accessed initially before being put into use in this illustrated embodiment, or this embodiment could be invoked dynamically to provide current assessments for a user when requested based on whatever relevant information was available at that time.

The routine 2100 starts at step 2105, where it receives an indication to evaluate a user. The indication may be, for example, a flag set by a rating assessment routine, such as the rating assessment routine 2000 illustrated in FIG. 20. The routine 2100 proceeds from step 2105 to step 2110, where it obtains user history information, such as information regarding ratings provided by the user and non-rating activity by the user, such as purchases and identification information entered by the user. The routine proceeds from step 2110 to step 2115, where it obtains rating history information for other users that corresponds to the rating information obtained for the user. The routine proceeds from step 2115 to step 2120, where it initializes a user reliability score. The reliability score may be a raw score or it may contain components reflecting scores on one or more reliability indicators. The routine proceeds to step 2125, where it selects a rating by the user and proceeds to step 2130. At step 2130, the routine calls a rating assessment subroutine, such as, for example, the rating assessment routine 900 illustrated in FIG. 9 or the rating assessment routine 2000 illustrated in FIG. 20.

At step 2135, the routine adjusts the user reliability score based on information returned by the rating assessment subroutine, such as one or more indications that the selected rating is unreliable. The routine proceeds to step 2140, where it determines whether all the desired ratings by the user have been assessed. When it is determined that all the desired ratings by the user have not been assessed, the routine proceeds from step 2140 to step 2145, where it selects the next rating and returns to step 2130. When it is determined that all the desired ratings by the user have been assessed, the routine proceeds from step 2140 to step 2150, where it determines whether the user reliability score exceeds a threshold. When it is determined at step 2150 that the user reliability score exceeds the threshold, the routine proceeds to step 2155, where it provides an indication that the user is unreliable. This indication can be used, for example, by a system, such as the system illustrated in FIG. 8, to suppress all ratings or sets of ratings provided by the user. The routine proceeds from step 2155 to step 2160, where it stops. When it is determined at step 2150 that the user reliability score does not exceed the threshold, the routine proceeds to step 2160.

Those skilled in the art will also appreciate that in some embodiments the functionality provided by the routines (including subroutines) discussed above may be provided in alternative ways, such as being split among more routines or consolidated into less routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A method for a computing system to automatically detect unreliability of a rating from a user based at least in part on a pattern identified using prior ratings of the user, the method comprising:

receiving an indication of a rating that reflects an evaluation by a user related to a target item that is available for acquisition, the indicated rating being a rating by the user that is of a review of the target item provided by another user;

obtaining one or more indications of multiple other ratings by the user that reflect evaluations related to other items;

automatically analyzing by the computing system the indicated rating and the other ratings to determine whether one or more patterns in the indicated rating and other ratings identify an unreliability of the indicated rating, wherein the computing system is configured with instructions to perform the automatic analyzing of the indicated rating and the other ratings to determine whether one or more patterns in the indicated rating and other ratings identify an unreliability of the indicated rating; and if the unreliability of the indicated rating is identified based on the one or more patterns, providing an indication that the indicated rating is unreliable so as to exclude use of the indicated rating as part of an aggregate rating related to the target item, and otherwise including the use of the indicated rating as part of the aggregate rating related to the target item.

2. The method of claim 1 wherein the one or more patterns include a pattern indicating the user has a bias for and/or against a source associated with the target item.

3. The method of claim 1 wherein the indicated rating reflects an evaluation by the user of information related to the target item that is provided by another user, and wherein the one or more patterns include a pattern indicating the user has a bias for and/or against the another user.

4. The method of claim 1 including obtaining one or more indications related to other activities of the user, and wherein the automatic analyzing further includes analyzing the other activities in order to determine whether the user is using a shell account.

5. The method of claim 1 wherein the one or more patterns include a pattern indicating a user is generating blocks of ratings.

6. The method of claim 1 wherein the one or more patterns include a pattern indicating the user has a consistent positive or negative bias relative to ratings of other users.

7. The method of claim 1 further comprising:
obtaining one or more indications of multiple other ratings by other users that reflect evaluations related to the target item;
automatically analyzing the indicated rating and the multiple other ratings by the other users to identify an inconsistency of the indicated rating that is sufficient to exceed an inconsistency threshold; and
providing an indication that the indicated rating is inconsistent so as to exclude use of the indicated rating for the target item.

8. The method of claim 1 further comprising:
obtaining one or more indications of multiple other ratings by other users that reflect evaluations related to the other items;
automatically analyzing the other ratings by the user and the other ratings by the other users to identify an inconsistency of the other ratings by the user that is sufficient to exceed an inconsistency threshold; and
providing an indication that the ratings of the user are inconsistent with the ratings of other users so as to exclude use of the indicated rating for the target item.

9. The method of claim 1 further comprising, if the unreliability of the indicated rating is identified based on the one or more patterns, automatically determining whether to suppress the user as being unreliable based at least in part on whether one or more of the other ratings by the user are identified as unreliable.

10. The method of claim 9 including, if it is determined to suppress the user as being unreliable, automatically excluding use of at least some other ratings previously provided by the user and/or automatically excluding use of at least some additional ratings if provided by the user in the future.

11. The method of claim 9 including, if it is determined to suppress the user as being unreliable, automatically determining at a later time whether to remove the suppression of the user based at least in part on activities of the user after the suppression.

12. The method of claim 1 wherein the indicated rating related to the target item is a rating of the target item.

13. The method of claim 1 wherein the evaluation of the user related to the target item reflects a subjective opinion of the user.

14. The method of claim 1 wherein the indicated rating is a boolean vote.

15. The method of claim 1 wherein the indicated rating is a numerical rating.

16. The method of claim 15 wherein the numerical rating is a rating of the target item.

17. The method of claim 1 wherein the indicated rating includes textual comments provided by the user.

18. The method of claim 1 wherein the identifying of the indicated rating as unreliable includes determining that an assessed degree of unreliability of the indicated rating exceeds a first unreliability threshold, and wherein the method further comprises, if the unreliability of the indicated rating is identified based on the one or more patterns, automatically analyzing each of at least some other ratings previously provided by the user to determine whether an assessed degree of unreliability of that other rating exceeds a second unreliability threshold that is lower than the first unreliability threshold, and otherwise not performing the automatic analyzing of the at least some other ratings previously provided by the user.

19. The method of claim 1 wherein the indicated rating and the other ratings by the user are provided in an anonymous manner such that an identity of the user is unknown.

20. The method of claim 19 including further assessing the unreliability of the indicated rating by comparing the indicated rating to ratings of other users whose identities are unknown.

21. The method of claim 1 including further assessing the unreliability of the indicated rating based at least in part on additional information obtained about the user.

22. The method of claim 1 wherein the one or more patterns include a pattern indicating that at least some of the other ratings are provided by an automated program on behalf of the user.

23. The method of claim 1 including automatically identifying the indicated rating as being unreliable if prior activities of the user do not satisfy specified criteria.

24. The method of claim 1 including automatically identifying whether other ratings indicated as being from other users were provided by the user, and identifying the indicated rating as being unreliable if one or more of the other ratings indicated as being from other users were identified as being provided by the user.

25. The method of claim 1 including automatically analyzing ratings from multiple users related to each of multiple items to determine whether at least some of the multiple users are collaborating together to provide consistent ratings, and when it is determined that at least some of the multiple users are collaborating together to provide consistent ratings, identifying those consistent ratings as being unreliable.

26. The method of claim 1 wherein the identifying of the indicated rating as unreliable includes determining that an assessed degree of unreliability of the indicated rating exceeds a first unreliability threshold, and including when the assessed degree of unreliability of the indicated rating does not exceed the first unreliability threshold but does exceed a second lower unreliability threshold, providing an indication that the indicated rating is suspect so as to restrict use of the indicated rating.

27. The method of claim 26 wherein the restricted use of the indicated rating includes using the indicated rating as part of the aggregate rating in such a manner that the indicated rating is given a lower weight than other ratings that are not suspect.

28. The method of claim 26 wherein the restricted use of the indicated rating includes temporarily excluding use of the indicated rating as part of the aggregate rating until additional analysis of the indicated rating is completed.

29. The method of claim 1 wherein the providing of the indication that the indicated rating is unreliable so as to exclude use of the indicated rating is performed in such a manner as to obfuscate the excluding from the user.

30. The method of claim 1 wherein the identifying of the indicated rating as unreliable includes determining that an assessed degree of unreliability of the indicated rating exceeds a first unreliability threshold, and including automatically revising the first unreliability threshold based at least in part on an automated analysis of ratings identified as unreliable so as to improve further identifications of unreliable ratings.

31. The method of claim 1 wherein the target item is a product and/or a service offered by an online retailer.

32. The method of claim 1 wherein identifying that the indicated rating is unreliable reflects an assessment of intentional fraudulent activity by the user.

33. The method of claim 1 including, if the unreliability of the indicated rating is not identified, presenting information regarding the target item to other users that is based at least in part on the indicated rating.

34. The method of claim 33 including, if the unreliability of the indicated rating is not identified, automatically generating the aggregate rating based on the indicated rating and on ratings from other users, and wherein the presented information includes an indication of the aggregate rating.

35. The method of claim 1 wherein the obtaining of the indications of the multiple other ratings by the user includes obtaining information from a second computing system, and wherein the indication that the indicated rating is unreliable is provided to the second computing system.

36. A method for a computing system to automatically detect unreliability of a rating from a user based at least in part on a pattern identified using prior ratings of the user, the method comprising:

receiving an indication of a rating that reflects an evaluation by a user related to a target item that is available for acquisition;

obtaining one or more indications of multiple other ratings by the user that reflect evaluations related to other items;

automatically analyzing by the computing system the indicated rating and the other ratings to determine whether one or more patterns in the indicated rating and other ratings identify an unreliability of the indicated rating, the one or more patterns including a pattern indicating a user is generating blocks of ratings, wherein the blocks of ratings by the user are indicated by one of the patterns as being prolific block rating by a new rater, and wherein the computing system is configured with instructions to perform the automatic analyzing of the indicated rating and the other ratings to determine whether one or more patterns in the indicated rating and other ratings identify an unreliability of the indicated rating, the one or more patterns including a pattern indicating a user is generating blocks of ratings; and if the unreliability of the indicated rating is identified based on the one or more patterns, providing an indication that the indicated rating is unreliable so as to exclude use of the indicated rating as part of an aggregate rating related to the target item, and otherwise including the use of the indicated rating as part of the aggregate rating related to the target item.

37. The method of claim 36 wherein the one or more patterns further include at least one of a pattern indicating the user has a bias for and/or against a source associated with the target item, of a pattern indicating the user has a bias for and/or against another user who provided information to which the evaluation corresponds, and of a pattern indicating the user has a consistent positive or negative bias relative to ratings of other users.

38. The method of claim 36 wherein the one or more patterns further include a pattern indicating that at least some of the other ratings are provided by an automated program on behalf of the user.

39. The method of claim 36 further comprising obtaining one or more indications related to other activities of the user, and wherein the automatic analyzing further includes analyzing the other activities in order to determine whether the user is using a shell account.

40. The method of claim 36 further comprising, if the unreliability of the indicated rating is identified based on the one or more patterns, automatically determining to suppress the user as being unreliable based at least in part on one or more of the other ratings by the user being identified as unreliable, so as to restrict use of at least some of the ratings provided by the user.

41. The method of claim 36 further comprising automatically identifying whether other ratings indicated as being from other users were provided by the user, and identifying the indicated rating as being unreliable if one or more of the other ratings indicated as being from other users were identified as being provided by the user.

42. The method of claim 36 further comprising automatically analyzing ratings from multiple users related to each of multiple items to determine whether at least some of the multiple users are collaborating together to provide consistent ratings, and identifying consistent ratings as being unreliable if it is determined that at least some of the multiple users are collaborating together to provide those consistent ratings.

43. The method of claim 36 wherein the identifying of the indicated rating as unreliable includes determining that an assessed degree of unreliability of the indicated rating exceeds a first unreliability threshold, and wherein the method further comprises, if the assessed degree of unreliability of the indicated rating does not exceed the first unreliability threshold but does exceed a second lower unreliability threshold, providing an indication that the indicated rating is suspect so as to restrict use of the indicated rating, the restricted use of the indicated rating including at least one of using the indicated rating as part of the aggregate rating in such a manner that the indicated rating is given a lower weight than other ratings that are not suspect, and of temporarily excluding use of the indicated rating as part of the aggregate rating until additional analysis of the indicated rating is completed.

44. The method of claim 36 further comprising, if the unreliability of the indicated rating is not identified, automatically generating the aggregate rating based on the indicated rating and on ratings from multiple other users, and presenting an indication of the generated aggregate rating to one or more users.

45. A method for a computing system to automatically detect unreliability of a rating from a user based at least in part on a pattern identified using prior ratings of the user, the method comprising:

receiving an indication of a rating that reflects an evaluation by a user related to a target item that is available for acquisition, the indicated rating being a numerical rating of a usefulness of a review of the target item by another user;

obtaining one or more indications of multiple other ratings by the user that reflect evaluations related to other items;

automatically analyzing by the computing system the indicated rating and the other ratings to determine whether one or more patterns in the indicated rating and other ratings identify an unreliability of the indicated rating, wherein the computing system is configured with instructions to perform the automatic analyzing of the indicated rating and the other ratings to determine whether one or more patterns in the indicated rating and other ratings identify an unreliability of the indicated rating; and if the unreliability of the indicated rating is identified based on the one or more patterns, providing an indication that the indicated rating is unreliable so as to exclude use of the indicated rating as part of an aggregate rating related to the target item, and otherwise including the use of the indicated rating as part of the aggregate rating related to the target item.

46. The method of claim 45 wherein the one or more patterns include multiple of a pattern indicating the user has a bias for and/or against a source associated with the target item, of a pattern indicating the user has a bias for and/or against the another user who provided the review to which the evaluation corresponds, and of a pattern indicating the user has a consistent positive or negative bias relative to ratings of other users.

47. The method of claim 45 further comprising obtaining one or more indications related to other activities of the user, and wherein the automatic analyzing further includes analyzing the other activities in order to identify whether the indicated rating is unreliable.

48. The method of claim 45 further comprising:

obtaining one or more indications of multiple other ratings by other users that reflect evaluations of the usefulness of the review of the target item;

automatically analyzing the indicated rating and the multiple other ratings by the other users to identify an inconsistency of the indicated rating; and providing an indication that the indicated rating is inconsistent so as to exclude use of the indicated rating for the target item.

49. The method of claim 45 further comprising, if the unreliability of the indicated rating is identified based on the one or more patterns, automatically determining whether to suppress the user as being unreliable so as to restrict use of at least some ratings provided by the user.

50. The method of claim 45 wherein the identifying of the indicated rating as unreliable includes determining that an assessed degree of unreliability of the indicated rating exceeds a first unreliability threshold, and wherein the method further comprises, if the assessed degree of unreliability of the indicated rating does not exceed the first unreliability threshold but does exceed a second lower unreliability threshold, providing an indication that the indicated rating is suspect so as to restrict use of the indicated rating, the restricted use of the indicated rating including at least one of using the indicated rating as part of the aggregate rating in such a manner that the indicated rating is given a lower weight than other ratings that are not suspect, and of temporarily excluding use of the indicated rating as part of the aggregate rating until additional analysis of the indicated rating is completed.

51. The method of claim 45 further comprising, if the unreliability of the indicated rating is not identified, automatically generating the aggregate rating based on the indicated rating and on ratings from multiple other users, the generated aggregate rating being an aggregate rating of the target item review from the another user, and selecting the target item review to provide to other users based at least in part on the generated aggregate rating.

52. A method for a computing system to automatically detect unreliability of a rating from a user based at least in part on a pattern identified using prior ratings of the user, the method comprising:

receiving an indication of a rating that reflects an evaluation by a user related to a target item that is available for acquisition, and wherein the computing system is operated on behalf of an online retailer who offers the target item;

obtaining one or more indications of multiple other ratings by the user that reflect evaluations related to other items;

automatically analyzing by the computing system the indicated rating and the other ratings to determine whether one or more patterns in the indicated rating and other ratings identify an unreliability of the indicated rating, the automatic analyzing including automatically identifying the indicated rating as being unreliable if prior activities of the user do not satisfy specified criteria, wherein the specified criteria include a specified number of one or more prior purchases by the user from the online retailer, and wherein the computing system is configured with instructions to perform the automatic analyzing of the indicated rating and the other ratings to determine whether one or more patterns in the indicated rating and other ratings identify an unreliability of the indicated rating, the automatic analyzing including automatically identifying the indicated rating as being unreliable if prior activities of the user do not satisfy specified criteria; and if the unreliability of the indicated rating is identified based on the one or more patterns, providing an indication that the indicated rating is unreliable so as to exclude use of the indicated rating as part of an aggregate rating related to the target item, and otherwise including the use of an indicated rating as part of the aggregate rating related to the target item.

53. The method of claim 52 wherein the one or more patterns include a pattern indicating the user has a bias for and/or against a source associated with the target item, of a pattern indicating the user has a bias for and/or against another user who provided information to which the evaluation corresponds, and of a pattern indicating the user has a consistent positive or negative bias relative to ratings of other users.

54. The method of claim 52 further comprising obtaining one or more indications related to other activities of the user, and wherein the automatic analyzing further includes analyzing the other activities in order to identify whether the indicated rating is unreliable.

55. The method of claim 52 further comprising:

obtaining one or more indications of multiple other ratings by other users that reflect evaluations related to the target item;

automatically analyzing the indicated rating and the multiple other ratings by the other users to identify an inconsistency of the indicated rating; and providing an indication that the indicated rating is inconsistent so as to exclude use of the indicated rating for the target item.

56. The method of claim 52 further comprising, if the unreliability of the indicated rating is identified based on the one or more patterns, automatically determining whether to suppress the user as being unreliable so as to restrict use of at least some ratings provided by the user.

57. The method of claim 52 further comprising automatically identifying whether other ratings indicated as being from other users were provided by the user, and identifying the indicated rating as being unreliable if one or more of the other ratings indicated as being from other users were identified as being provided by the user.

58. The method of claim 52 further comprising automatically analyzing ratings from multiple users related to each of multiple items to determine whether at least some of the multiple users are collaborating together to provide consistent ratings, and identifying consistent ratings as being unreliable if it is determined that at least some of the multiple users are collaborating together to provide those consistent ratings.

59. The method of claim 52 wherein the identifying of the indicated rating as unreliable includes determining that an assessed degree of unreliability of the indicated rating exceeds a first unreliability threshold, and wherein the method further comprises, if the assessed degree of unreliability of the indicated rating does not exceed the first unreliability threshold but does exceed a second lower unreliability threshold, providing an indication that the indicated rating is suspect so as to restrict use of the indicated rating, the restricted use of the indicated rating including at least one of using the indicated rating as part of the aggregate rating in such a manner that the indicated rating is given a lower weight than other ratings that are not suspect, and of temporarily excluding use of the indicated rating as part of the aggregate rating until additional analysis of the indicated rating is completed.

60. The method of claim 52 further comprising, if the unreliability of the indicated rating is not identified, automatically generating the aggregate rating based on the indicated rating and on ratings from multiple other users, and presenting an indication of the generated aggregate rating to one or more customers of the online retailer to facilitate potential purchases by the one or more customers of the target item.

61. A method for a computing system of an online retailer to automatically detect fraudulent votes received from customers who are evaluating item reviews supplied by other customers, the method comprising:
presenting to a first customer a first item review for an item available from the merchant, the first item review provided by a distinct second customer;
receiving a first vote from the first customer that reflects an evaluation by the first customer of a usefulness of the first item review;
automatically assessing by the computing system whether the first vote is fraudulent by,
retrieving information regarding a vote history of the first customer that includes multiple prior votes of the first customer, each prior vote reflecting an evaluation by the first customer of a usefulness of an item review distinct from the first item review that was provided by a customer distinct from the first customer;
retrieving information regarding multiple prior votes of other customers that reflect evaluations by those other customers of usefulness of the first item review;
evaluating unreliability of the first vote by comparing the first vote and the vote history of the first customer to multiple predefined patterns associated with unreliable vote histories and by comparing the first vote to the information regarding the prior votes of the other customers for the first item review; and
if the evaluated unreliability of the first vote exceeds a predefined unreliability threshold, identifying the first vote as fraudulent, and otherwise not identifying the first vote as fraudulent,
wherein the computing system is configured with instructions to perform the automatic assessing by retrieving information regarding a vote history of the first customer that includes multiple prior votes of the first customer, each prior vote reflecting an evaluation by the first customer of a usefulness of an item review distinct from the first item review that was provided by a customer distinct from the first customer, retrieving information regarding multiple prior votes of other customers that reflect evaluations by those other customers of usefulness of the first item review, and evaluating unreliability of the first vote by comparing the first vote and the vote history of the first customer to multiple predefined patterns associated with unreliable vote histories and by comparing the first vote to the information regarding the prior votes of the other customers for the first item review; and
when the first vote is identified as fraudulent, automatically excluding by the computing system the first vote from a group of votes used to rate the usefulness of the first item review,
wherein the computing system is further configured with instructions to perform the automatic excluding of the first votes when the first vote is identified as fraudulent.

62. The method of claim 61 further comprising automatically rating the usefulness of the first item review based on the group of votes, and automatically determining whether to present the first item review to another customer based at least in part on the usefulness rating.

63. The method of claim 62 wherein the first vote is automatically included in the group of votes used to rate the usefulness of the first item review when the first vote is not identified as fraudulent.

64. The method of claim 61 wherein the multiple predefined patterns associated with unreliable vote histories include at least two of:
a pattern indicating the first customer has a bias against or in favor of a source associated with the available item;
a pattern indicating the first customer has a bias against or in favor of the second customer;
a pattern indicating the first customer is using a shell account that is used only for voting; and
a pattern indicating the first customer is engaging in block voting that includes multiple instances of casting numerous votes over small periods of time and of not casting any votes over other longer periods of time.

65. The method of claim 61 wherein the evaluating of the unreliability of the first vote by comparing the first vote and the vote history of the first customer to multiple predefined patterns associated with unreliable vote histories includes, for each match that is detected to a pattern in the multiple predefined patterns, incrementing an unreliability score for the first vote by an amount that is based at least in part on the matched pattern.

66. The method of claim 61 including, for each of one or more of the distinct item reviews evaluated by the first customer in the multiple prior votes of the first customer, retrieving information regarding multiple prior votes of other customers that reflect evaluations by those other customers of usefulness of the distinct item review, and wherein the evaluating of the unreliability of the first vote further comprises comparing the one or more prior votes of the first customer for those distinct item reviews to corresponding votes by other customers for those distinct item reviews.

67. The method of claim 61 wherein the retrieved information regarding the vote history of the first customer includes multiple other prior votes by the first customer that each reflect evaluations by the first customer of other than a usefulness of an item review, and including automatically evaluating the other votes by comparing the other votes to one or more other predefined patterns.

68. The method of claim 61 further comprising, if the first vote is identified as fraudulent, automatically evaluating one or more prior votes of the first customer to determine whether those prior votes are fraudulent, and if the first vote is identified as fraudulent and if one or more other prior votes from the first customer are identified as fraudulent, automatically determining whether to exclude all prior votes from the first customer and/or all future votes from the first customer based on an assessed unreliability of the first customer.

69. The method of claim 61 wherein the retrieved information regarding the multiple prior votes of the other customers includes information summarizing those prior votes.

70. The method of claim 61 wherein an identification that the first vote is fraudulent reflects an assessment that the first vote does not accurately represent the first customer's evaluation of the first item review.

71. A computing system configured to automatically detect unreliability of a rating from a user based at least in part on a pattern identified using prior ratings of the user, comprising:
one or more memories;
a reliability assessor system configured to include software instructions stored in at least one of the one or more memories and that when executed by a processor cause the computing system to receive an indication of a rating that reflects an evaluation by a user related to a target item that is available for acquisition, the indicated rating being a rating by the user that is of a review of the target item provided by another user, to obtain one or more indications of multiple other ratings by the user that reflect evaluations related to other items, and to automatically analyze the indicated rating and the other ratings to determine whether one or more patterns in the indicated rating and other ratings identify an unreliability of the indicated rating;
and a content manager system configured to include software instructions stored in at least one of the one or more memories and that when executed by a processor cause the computing system to manage the indicated rating by, if the unreliability of the indicated rating is identified based on the one or more patterns, excluding use of the indicated rating as part of an aggregate rating related to the target item, and otherwise including the use of the indicated rating as part of the aggregate rating related to the target item.

72. The computing system of claim 71, wherein the reliability assessor system includes a user assessor component configured to generate a usefulness assessment of the user based on an analysis of the indicated rating and of the multiple other ratings by the user, and wherein the content manager system is further configured to manage ratings provided by the user based at least in part on the generated usefulness assessment of the user.

73. The computing system of claim 71 wherein the reliability assessor system is configured to use multiple patterns to assess whether the indicated rating is unreliable by including multiple assessor components that are each configured to assess unreliability of the indicated rating corresponding to one of the multiple patterns, wherein the reliability assessor component further includes a rating assessment aggregator component to aggregate unreliability assessments from the multiple assessor components, and wherein the reliability assessor system is further configured to receive indications of one or more new patterns of reliability and to use the new patterns of reliability as part of further generating of aggregate reliability assessments for ratings.

74. The computing system of claim 71 wherein the content manager system is further configured to generate the aggregate rating related to the target item, the generated aggregate rating being an aggregate rating of the target item review provided by the another user, and to select the provided target item review to provide to other users based at least in part on the generated aggregate rating.

75. The computing system of claim 71 wherein the reliability assessor system consists of a means for receiving an indication of a rating that reflects an evaluation by a user related to a target item that is available for acquisition, the indicated rating being a rating by the user that is of a review of the target item provided by another user, for obtaining one or more indications of multiple other ratings by the user that reflect evaluations related to other items, and for automatically analyzing the indicated rating and the other ratings to determine whether one or more patterns in the indicated rating and other ratings identify an unreliability of the indicated rating.

76. The computing system of claim 71 wherein the one or more patterns include at least one of a pattern indicating the user has a bias for and/or against a source associated with the target item, of a pattern indicating the user has a bias for and/or against the another user who provided the target item review, and of a pattern indicating the user has a consistent positive or negative bias relative to ratings of other users.

77. The computing system of claim 76 wherein the one or more patterns further include a pattern indicating that at least some of the other ratings are provided by an automated program on behalf of the user.

78. The computing system of claim 71 wherein the reliability assessor system is further configured to automatically analyze obtained information related to other activities of the user in order to identify whether the indicated rating is likely to be unreliable.

79. The computing system of claim 71 wherein the reliability assessor system is further configured to:
obtain one or more indications of multiple other ratings by other users that reflect evaluations of the target item review;
automatically analyze the indicated rating and the multiple other ratings by the other users to identify an inconsistency of the indicated rating with respect to the multiple other ratings; and
provide an indication that the indicated rating is inconsistent so as to exclude use of the indicated rating for the target item.

80. The computing system of claim 71 wherein the reliability assessor system is further configured to:
obtain one or more indications of multiple other ratings by other users that reflect evaluations related to the other items;
automatically analyze the other ratings by the user and the other ratings by the other users to identify an inconsistency of the other ratings by the user; and provide an indication that the other ratings of the user are inconsistent so as to exclude use of the indicated rating for the target item.

81. The computing system of claim 71 wherein the reliability assessor system includes a user assessment aggregator component that is configured to, if the unreliability of the indicated rating is identified based on the one or more patterns, automatically determine whether to suppress the user as being unreliable so as to restrict use of at least some ratings provided by the user.

82. The computing system of claim 71 wherein the reliability assessor system is further configured to automatically identify whether other ratings indicated as being from other users were provided by the user, and to identify the indicated rating as being unreliable if one or more of the other ratings indicated as being from other users are identified as being provided by the user.

83. The computing system of claim 71 wherein the reliability assessor system is further configured to automatically analyze ratings from multiple users related to each of multiple items to determine whether at least some of the multiple users are collaborating together to provide consistent ratings, and to identify consistent ratings as being unreliable if it is determined that at least some of the multiple users are collaborating together to provide those consistent ratings.

84. The computing system of claim 71 wherein the identifying of the indicated rating as unreliable includes determining that an assessed degree of unreliability of the indicated rating exceeds a first unreliability threshold, and wherein the reliability assessor system is further configured to, if the assessed degree of unreliability of the indicated rating does not exceed the first unreliability threshold but does exceed a second lower unreliability threshold, indicate that the indicated rating is suspect so as to restrict use of the indicated rating, the restricted use of the indicated rating including at least one of using the indicated rating as part of the aggregate rating in such a manner that the indicated rating is given a lower weight than other ratings that are not suspect, and of temporarily excluding use of the indicated rating as part of the aggregate rating until additional analysis of the indicated rating is completed.

85. The computing system of claim 71 wherein the one or more patterns include a pattern indicating the user is generating prolific blocks of ratings by a new rater, and wherein the reliability assessor system is further configured to identify the indicated rating as being unreliable based on the generating of the prolific blocks of ratings.

86. The computing system of claim 71 wherein the indicated rating is a numerical rating of usefulness of the target item review.

87. The computing system of claim 71 wherein the computing system is operated on behalf of an online retailer who offers the target item, and wherein the automatic analyzing includes automatically identifying the indicated rating as being unreliable if prior activities of the user related to shopping interactions by the user with the online retailer do not satisfy specified criteria.

88. A computer-readable storage medium whose contents are instructions that when executed cause a computing device to automatically detect unreliability of a rating from a user based at least in part on a pattern using prior ratings of the user, by performing a method comprising:
receiving an indication of a rating that reflects an evaluation by a user related to a target item that is available for acquisition, the indicated rating being a rating by the user that is of a review of the target item provided by another user;
obtaining one or more indications of multiple other ratings by the user that reflect evaluations related to other items;
automatically analyzing the indicated rating and the other ratings to determine whether one or more patterns in the indicated rating and other ratings identify an unreliability of the indicated rating; and
if the unreliability of the indicated rating is identified based on the one or more patterns, indicating that the indicated rating is unreliable so as to exclude use of the indicated rating as part of an aggregate rating related to the target item, and otherwise including the use of the indicated rating as part of the aggregate rating related to the target item.

89. The computer-readable storage medium of claim 88 wherein the one or more patterns include at least one of a pattern indicating the user has a bias for and/or against a source associated with the target item, of a pattern indicating the user has a bias for and/or against the another user who provided the target item review, and of a pattern indicating the user has a consistent positive or negative bias relative to ratings of other users.

90. The computer-readable storage medium of claim 88 wherein the one or more patterns include a pattern indicating that at least some of the other ratings are provided by an automated program on behalf of the user.

91. The computer-readable storage medium of claim 88 wherein the method further comprises obtaining one or more indications related to other activities of the user, and wherein the automatic analyzing further includes analyzing the other activities in order to identify whether the indicated rating is unreliable.

92. The computer-readable storage medium of claim 88 wherein the method further comprises:
obtaining one or more indications of multiple other ratings by other users that reflect evaluations of the target item review;
automatically analyzing the indicated rating and the multiple other ratings by the other users to identify an inconsistency of the indicated rating with respect to the multiple other ratings; and
providing an indication that the indicated rating is inconsistent so as to exclude use of the indicated rating for the target item.

93. The computer-readable storage medium of claim 88 wherein the method further comprises:
obtaining one or more indications of multiple other ratings by other users that reflect evaluations related to the other items;
automatically analyzing the other ratings by the user and the other ratings by the other users to identify an inconsistency of the other ratings by the user; and
providing an indication that the other ratings of the user are inconsistent so as to exclude use of the indicated rating for the target item.

94. The computer-readable storage medium of claim 88 wherein the method further comprises, if the unreliability of the indicated rating is identified based on the one or more patterns, automatically determining whether to suppress the user as being unreliable so as to restrict use of at least some ratings provided by the user.

95. The computer-readable storage medium of claim 88 wherein the method further comprises automatically identifying whether other ratings indicated as being from other users were provided by the user, and identifying the indicated rating as being unreliable if one or more of the other ratings indicated as being from other users are identified as being provided by the user.

96. The computer-readable storage medium of claim 88 wherein the method further comprises automatically analyzing ratings from multiple users related to each of multiple items to determine whether at least some of the multiple users are collaborating together to provide consistent ratings, and identifying consistent ratings as being unreliable if it is determined that at least some of the multiple users are collaborating together to provide those consistent ratings.

97. The computer-readable storage medium of claim 88 wherein the identifying of the indicated rating as unreliable includes determining that an assessed degree of unreliability of the indicated rating exceeds a first unreliability threshold, and wherein the method further comprises, if the assessed degree of unreliability of the indicated rating does not exceed the first unreliability threshold but does exceed a second lower unreliability threshold, providing an indication that the indicated rating is suspect so as to restrict use of the indicated rating, the restricted use of the indicated rating including at least one of using the indicated rating as part of the aggregate rating in such a manner that the indicated rating is given a lower weight than other ratings that are not suspect, and of temporarily excluding use of the indicated rating as part of the aggregate rating until additional analysis of the indicated rating is completed.

98. The computer-readable storage medium of claim 88 wherein the method further comprises, if the unreliability of the indicated rating is not identified, automatically generating the aggregate rating related to the target item based on the indicated rating and on ratings from other users, the generated aggregate rating being an aggregate rating of the target item review provided by the another user, and selecting the provided target item review to provide to other users based at least in part on the generated aggregate rating.

99. The computer-readable storage medium of claim 88 wherein the one or more patterns include a pattern indicating the user is generating prolific blocks of ratings by a new rater, and wherein the method further comprises identifying the indicated rating as being unreliable based on the generating of the prolific blocks of ratings.

100. The computer-readable storage medium of claim 88 wherein the indicated rating is a numerical rating of usefulness of the target item review.

101. The computer-readable storage medium of claim 88 wherein the computing device is operated on behalf of an online retailer who offers the target item, and wherein the automatic analyzing includes automatically identifying the indicated rating as being unreliable if prior activities of the user related to shopping interactions by the user with the online retailer do not satisfy specified criteria.

102. The computer-readable storage medium of claim 88 wherein the contents include one or more data structures for use in analyzing reliability of ratings, the data structure comprising multiple entries that each correspond to a defined pattern of unreliability of ratings and that each contain information for use in analyzing ratings in order to identify whether that pattern of unreliability is present in those ratings.

* * * * *

UNITED STATES PATENT AND TRADEMARK OFFICE
CERTIFICATE OF CORRECTION

PATENT NO.          : 7,519,562 B1
APPLICATION NO.     : 11/096699
DATED               : April 14, 2009
INVENTOR(S)         : Christopher D. Vander Mey et al.

Page 1 of 1

It is certified that error appears in the above-identified patent and that said Letters Patent is hereby corrected as shown below:

<u>Claim 61, Column 40, Line 32</u>
"first votes when the first vote is identified as fraudulent" should read --first vote when the first vote is identified as fraudulent--.

Signed and Sealed this

Twenty-fourth Day of November, 2009

David J. Kappos
*Director of the United States Patent and Trademark Office*